(12) United States Patent
Burnham et al.

(10) Patent No.: US 8,491,044 B2
(45) Date of Patent: Jul. 23, 2013

(54) INFINITELY ADJUSTABLE, MODULAR SHELVING FOR VEHICLES

(75) Inventors: Robert E. Burnham, Novi, MI (US); Frank A. Fabiano, Bronson, MI (US); Phillip M. Ownbey, Cleveland, TN (US)

(73) Assignee: Morgan Olson Corporation, Sturgis, MI (US)

( * ) Notice: Subject to any disclaimer, the term of this patent is extended or adjusted under 35 U.S.C. 154(b) by 0 days.

(21) Appl. No.: 13/040,063

(22) Filed: Mar. 3, 2011

(65) Prior Publication Data

US 2011/0266835 A1    Nov. 3, 2011

Related U.S. Application Data

(60) Provisional application No. 61/339,333, filed on Mar. 3, 2010.

(51) Int. Cl.
  *B62D 25/00*     (2006.01)
  *B61D 45/00*     (2006.01)

(52) U.S. Cl.
  USPC ........................... 296/193.04; 410/97

(58) Field of Classification Search
  USPC .... 296/24.44, 107.08, 76, 136.03, 39.1–39.3; 410/121, 97, 129
  See application file for complete search history.

(56) References Cited

U.S. PATENT DOCUMENTS

| | | | |
|---|---|---|---|
| 2,388,297 A | 11/1945 | Slaughter | |
| 3,178,775 A | 4/1965 | Tassell | |
| 3,239,081 A | 3/1966 | Poleschuk | |
| 3,338,619 A * | 8/1967 | Bartels | 296/24.44 |
| 3,367,287 A * | 2/1968 | Dunlop | 105/371 |
| 3,705,654 A | 12/1972 | Barrineau | |
| 3,909,914 A | 10/1975 | Symons | |
| 4,126,978 A | 11/1978 | Heller | |
| 4,381,715 A | 5/1983 | Forman | |
| 4,558,647 A | 12/1985 | Petersen | |
| 4,594,829 A | 6/1986 | Herrgord | |
| 5,139,300 A * | 8/1992 | Carriere | 296/39.1 |
| 5,306,064 A | 4/1994 | Padovano | |
| 5,318,264 A | 6/1994 | Meiste | |
| 5,345,737 A | 9/1994 | Latchinian | |
| D353,295 S | 12/1994 | Bodine | |
| 5,494,327 A | 2/1996 | Derecktor | |
| 5,605,238 A | 2/1997 | Jacobs | |
| 5,803,524 A * | 9/1998 | McCammon | 296/39.1 |
| 5,813,641 A | 9/1998 | Baldwin | |

(Continued)

OTHER PUBLICATIONS

U.S. Appl. No. 61/339,333, filed Mar. 3, 2010, Burnham.

(Continued)

*Primary Examiner* — Glenn Dayoan
*Assistant Examiner* — Sunsurraye Westbrook
(74) *Attorney, Agent, or Firm* — Ballard Spahr LLP

(57) ABSTRACT

A system for storing cargo or other items within a vehicle enclosure having a plurality of walls is disclosed. In one aspect, the system for storing cargo comprises a plurality of support posts. In an additional aspect, each support post defines a plurality of U-shaped receiving channels. In a further aspect, the support posts can be selectively secured within the vehicle enclosure. In one aspect, the system comprises means for retaining the cargo within the vehicle enclosure. In an additional aspect, the means for retaining the cargo within the enclosure can be attached to the receiving channels of the support posts.

20 Claims, 26 Drawing Sheets

U.S. PATENT DOCUMENTS

| | | | |
|---|---|---|---|
| 5,944,203 A * | 8/1999 | Vlah et al. | 211/189 |
| 6,119,878 A * | 9/2000 | Zen | 211/94.01 |
| 6,220,463 B1 | 4/2001 | Pullen | |
| 6,402,446 B1 * | 6/2002 | Nadherny et al. | 410/100 |
| D473,664 S | 4/2003 | Perkins | |
| 6,698,603 B2 | 3/2004 | Lawson | |
| 6,732,870 B2 | 5/2004 | Johansson | |
| D504,526 S | 4/2005 | Perkins | |
| D512,254 S | 12/2005 | Ottens | |
| 7,219,952 B2 | 5/2007 | Taylor | |
| 7,228,977 B2 * | 6/2007 | Perkins et al. | 211/94.01 |
| 7,293,667 B2 | 11/2007 | Flynn | |
| 7,350,468 B2 * | 4/2008 | Gatto et al. | 105/355 |
| 7,367,765 B2 * | 5/2008 | Frett | 410/118 |
| D604,978 S | 12/2009 | Shaha | |
| 7,811,152 B2 | 10/2010 | McEntyre | |
| D627,179 S | 11/2010 | Burnham | |
| 7,823,948 B2 | 11/2010 | Redman | |
| D633,315 S | 3/2011 | Burnham | |
| 2003/0155318 A1 | 8/2003 | Jacobs | |
| 2012/0271486 A1 | 10/2012 | McDonald | |

OTHER PUBLICATIONS

U.S. Appl. No. 29/345,294, filed Oct. 13, 2009, Burnham.

U.S. Appl. No. 29/376,942, filed Oct. 14, 2010, Burnham.

Requirement for Restriction dated Jun. 4, 2010 for U.S. Appl. No. 29/345,294 (US Patent No. D627,179) filed on Oct. 13, 2009 (1st Named Inventor—Burnham) (4 pages).

Response to Restriction dated Jul. 1, 2010 for U.S. Appl. No. 29/345,294 (US Patent No. D627,179) filed on Oct. 13, 2009 (1st Named Inventor—Burnham) (5 pages).

Notice of Allowance and Fees Due mailed Jul. 15, 2010 for U.S. Appl. No. 29/345,294 (US Patent No. D627,179) filed on Oct. 13, 2009 (1st Named Inventor—Burnham) (6 pages).

Issue Notification dated Oct. 27, 2010 for U.S. Appl. No. 29/345,294 (US Patent No. D627,179) filed on Oct. 13, 2009 (1st Named Inventor—Burnham) (1 page).

Preliminary Amendment dated Oct. 14, 2010 for U.S. Appl. No. 29/376,942 (US Patent No. D633,315) filed on Oct. 14, 2010 (1st Named Inventor—Burnham) (10 pages).

Notice of Allowance and Fees Due mailed Nov. 17, 2010 for U.S. Appl. No. 29/376,942 (US Patent No. D633,315) filed on Oct. 14, 2010 (1st Named Inventor—Burnham) (5 pages).

Issue Notification dated Feb. 9, 2011 for U.S. Appl. No. 29/376,942 (US Patent No. D633,315) filed on Oct. 14, 2010 (1st Named Inventor—Burnham) (1 page).

* cited by examiner

INFINITELY ADJUSTABLE, MODULAR SHELVING FOR VEHICLES

CROSS-REFERENCE TO RELATED APPLICATION

This application claims priority to U.S. Provisional Patent Application No. 61/339,333, filed Mar. 3, 2010, which application is hereby incorporated by reference in its entirety.

FIELD OF THE INVENTION

This invention relates to a system for storing cargo. More particularly, this invention relates to a modular system for storing cargo within a vehicle enclosure.

BACKGROUND OF THE INVENTION

Mobile enclosures such as freight vans, step vans, trailers, and other vehicles are commonly used for transporting cargo and other items. It is known to use retaining components, including shelving, cabinets, and cargo nets, to stabilize the cargo during movement of the mobile enclosure. However, these retaining components are commonly fastened and mechanically fixed in a certain location. Therefore, re-drilling and total disassembly of the retaining components are normally required for any relocation of the retaining components.

Thus, there is a need in the pertinent art for an easily adjustable cargo storage system that permits quick vertical re-positioning of retaining components without requiring re-drilling or disassembly of the retaining components. There is a further need in the pertinent art for an easily adjustable cargo storage system that permits quick horizontal re-positioning of retaining components without requiring re-drilling or disassembly of the retaining components.

SUMMARY

The invention relates to a system for storing cargo or other items within a vehicle enclosure having a plurality of walls. In one aspect, the system for storing cargo has a plurality of support posts. In another aspect, each support post has a first mounting portion and a second mounting portion joined by a connecting member. In an additional aspect, each support post defines a plurality of U-shaped receiving channels. In a further aspect, the support posts can be selectively secured within the vehicle enclosure. The support posts can be secured to a receiving channel defined within a wall of the vehicle enclosure.

In one aspect, the system for storing cargo has means for retaining the cargo within the vehicle enclosure. In an additional aspect, the means for retaining the cargo within the vehicle enclosure is configured for selective attachment to the receiving channels of the support posts. The means for retaining the cargo within the enclosure can be attached to the receiving channels of the support posts using screws, knobs, spring clips, and other attachment means.

DETAILED DESCRIPTION OF THE FIGURES

These and other features of the preferred embodiments of the invention will become more apparent in the detailed description in which reference is made to the appended drawings wherein.

Figure 19:
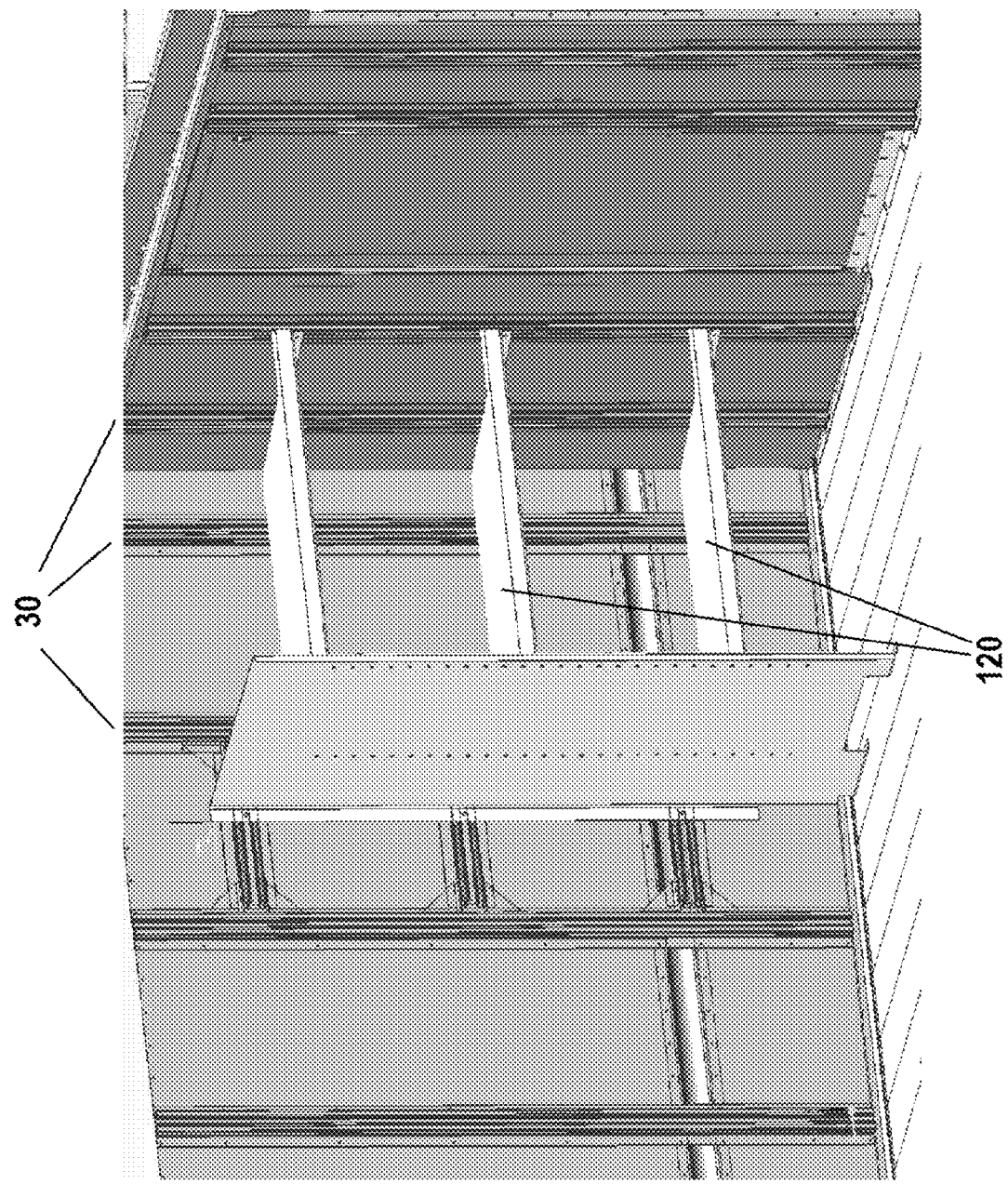

FIG. 19 is a perspective view of support shelving attached to a plurality of support posts, as shown, a plurality of horizontally positioned and spaced support posts, which can optionally be conventional support posts, can extend between respective adjacent and opposing substantially vertical support posts. As shown, this allows for multiple attachment points for a flanged edge portion of a substantially vertical panel to be coupled to the plurality of horizontally positioned and spaced support posts. In the exemplary non-limiting illustrated aspect, the opposing end edges of at least one support shelf can be coupled or attached to a pair of adjacent support posts and the substantially vertical panel, as described herein.

Figure 20:
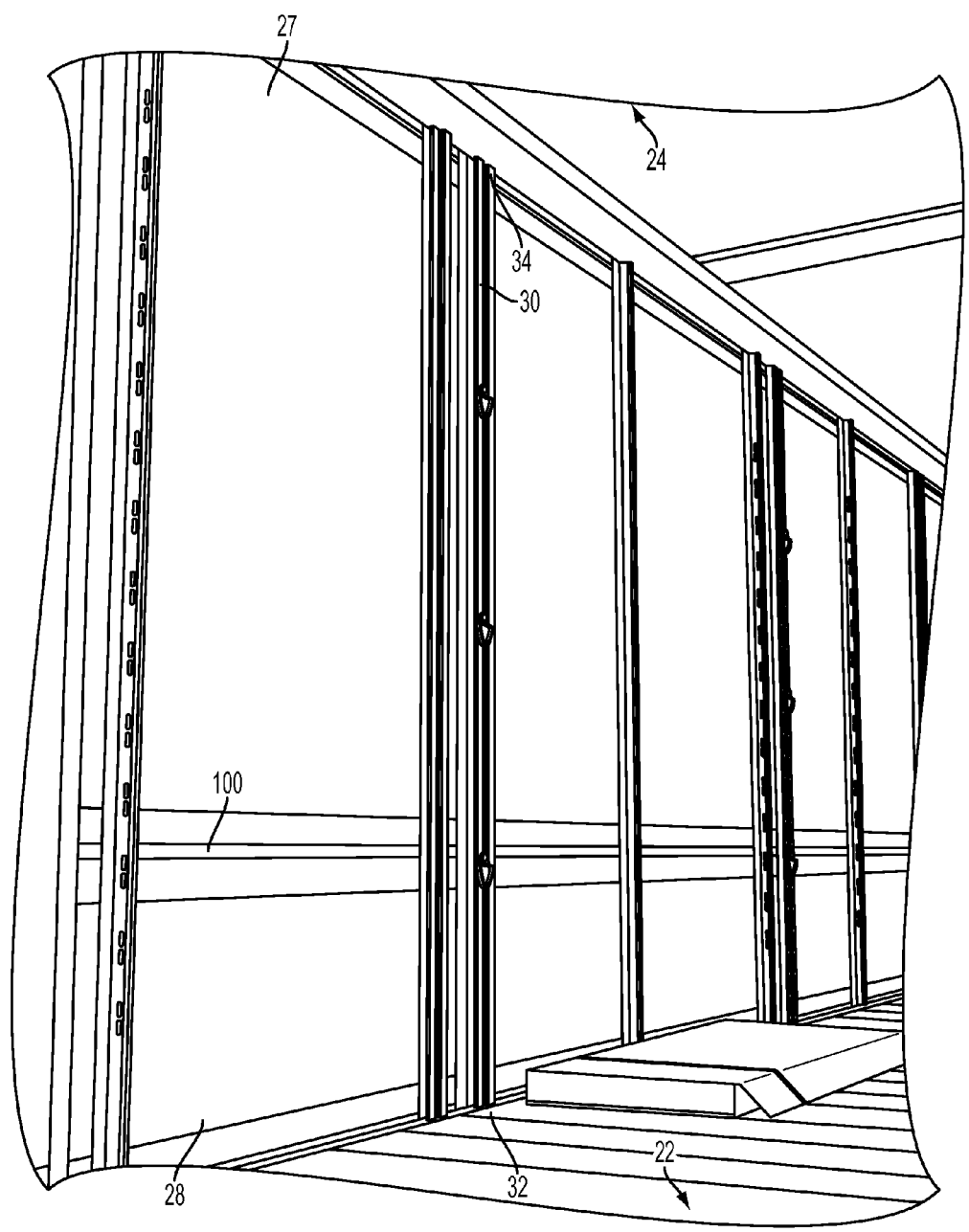

FIG. 20 is an image of the system for storing cargo within a vehicle enclosure, as described herein.

Figure 21:
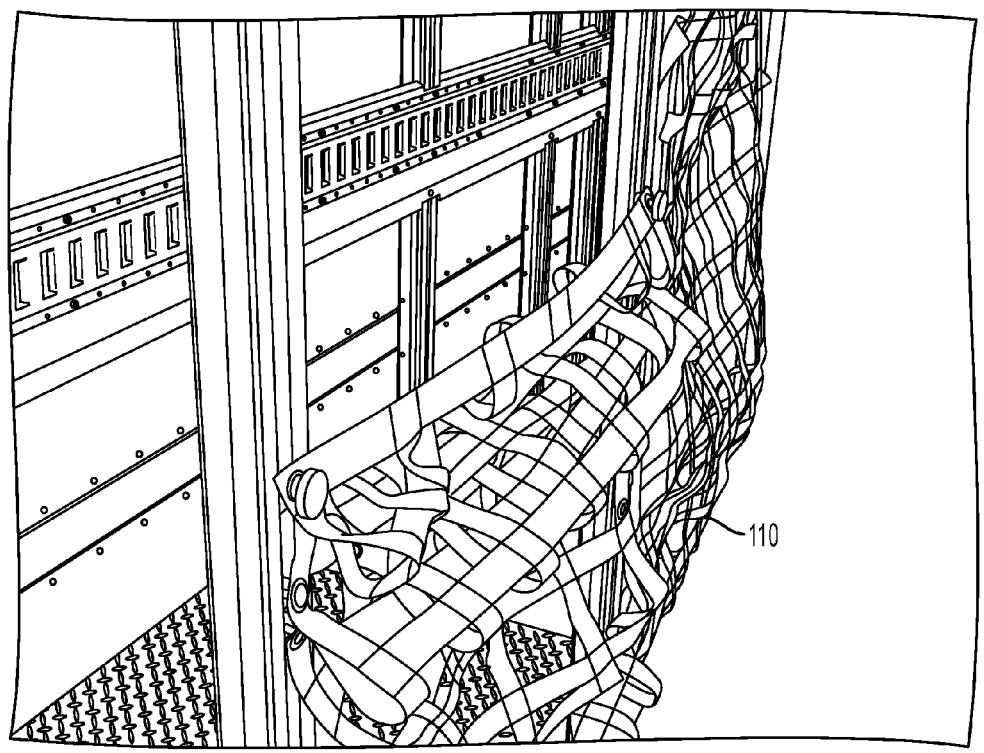

FIG. 21 is an image of a cargo net operatively coupled to a plurality of support posts for use in the system for storing cargo within the vehicle enclosure, as described herein.

Figure 22:
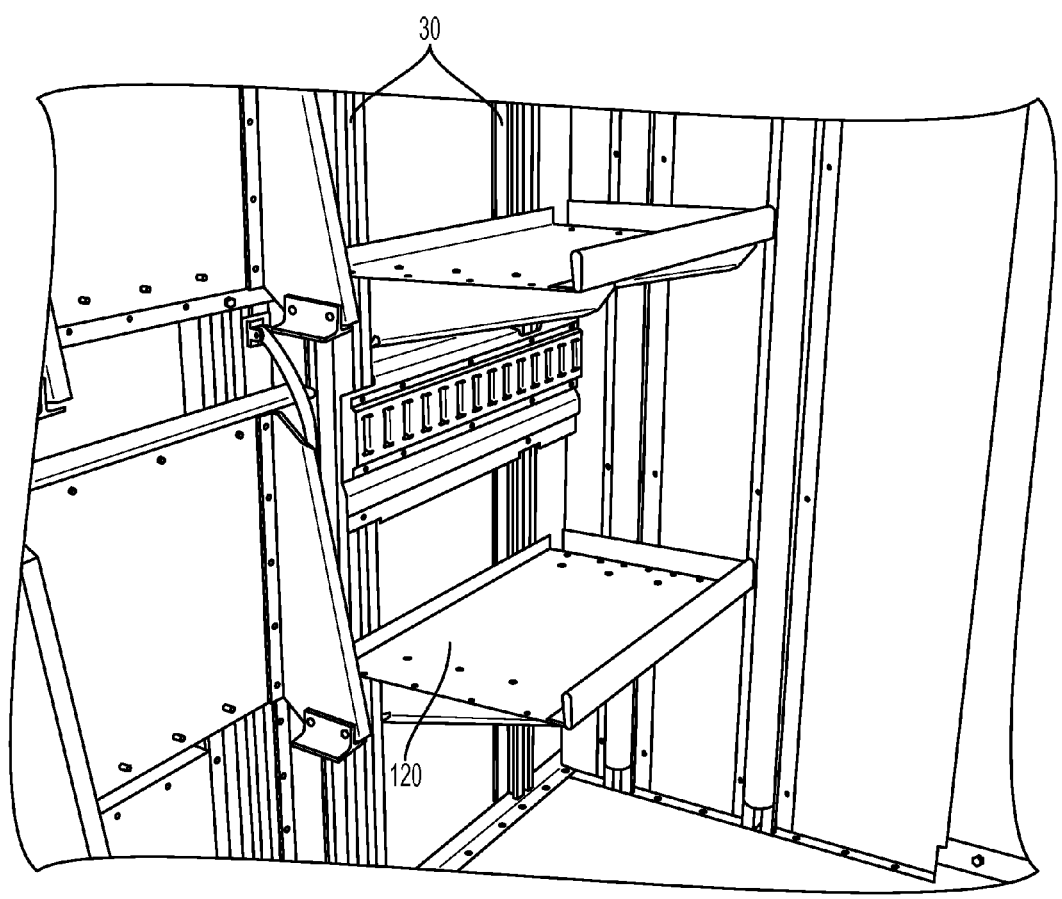

FIG. 22 is an image of fixed support shelving attached to a plurality of support posts, as described herein.

Figure 23:
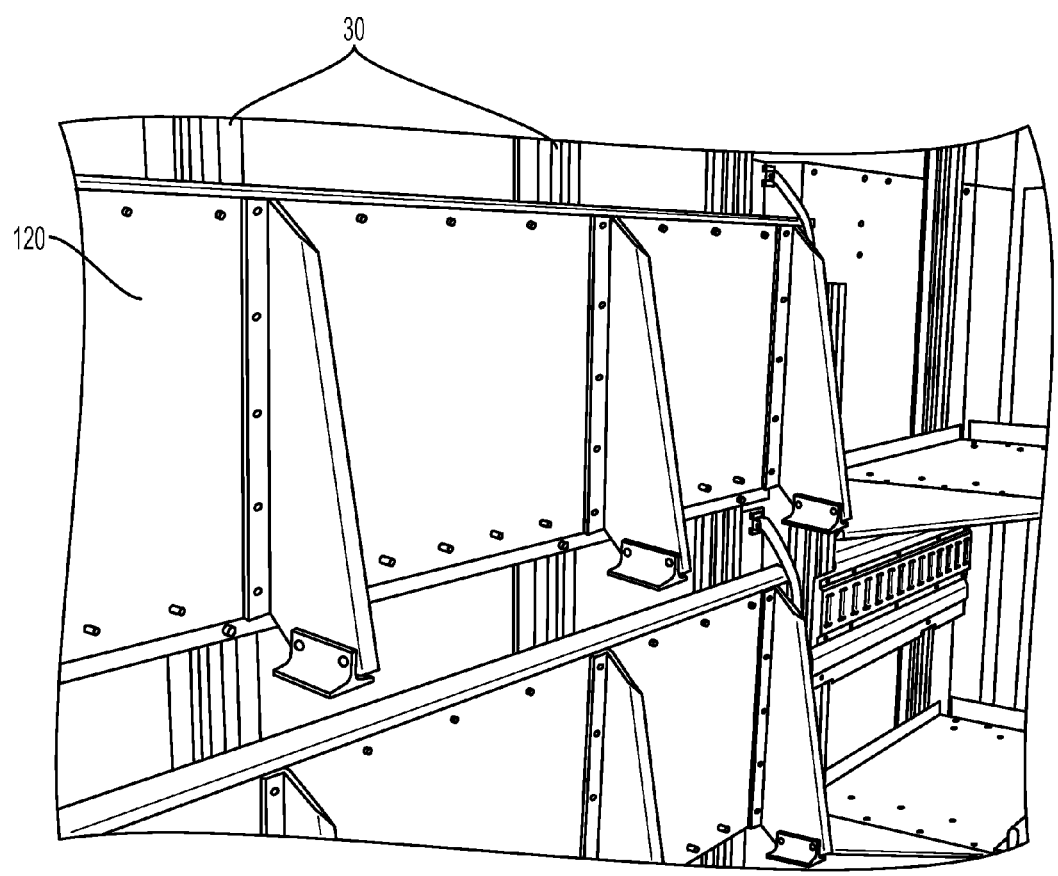

FIG. 23 is an image of folding support shelving attached to a plurality of support posts, as described herein.

Figure 24:
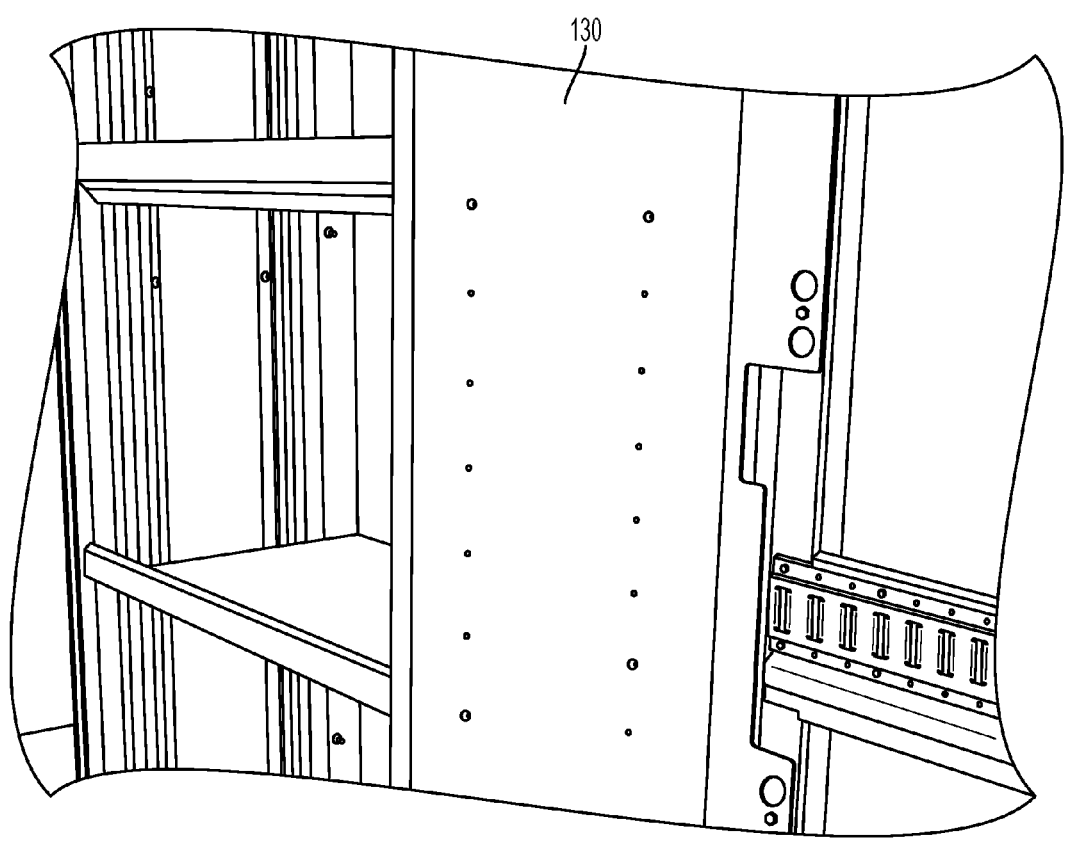

FIG. 24 is an image of bin shelving attached to a plurality of support posts, as described herein.

Figure 25:
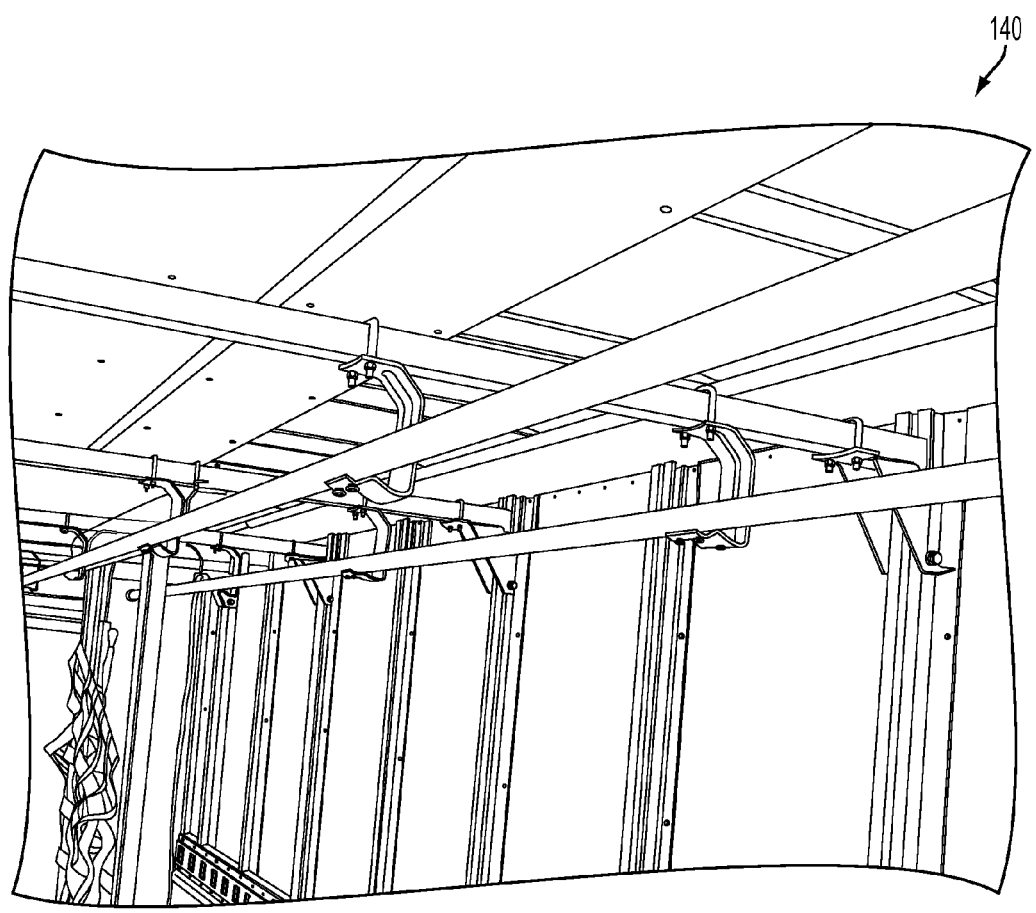

FIG. 25 is an image of a garment rack attached to a plurality of support posts, as described herein.

Figure 26:
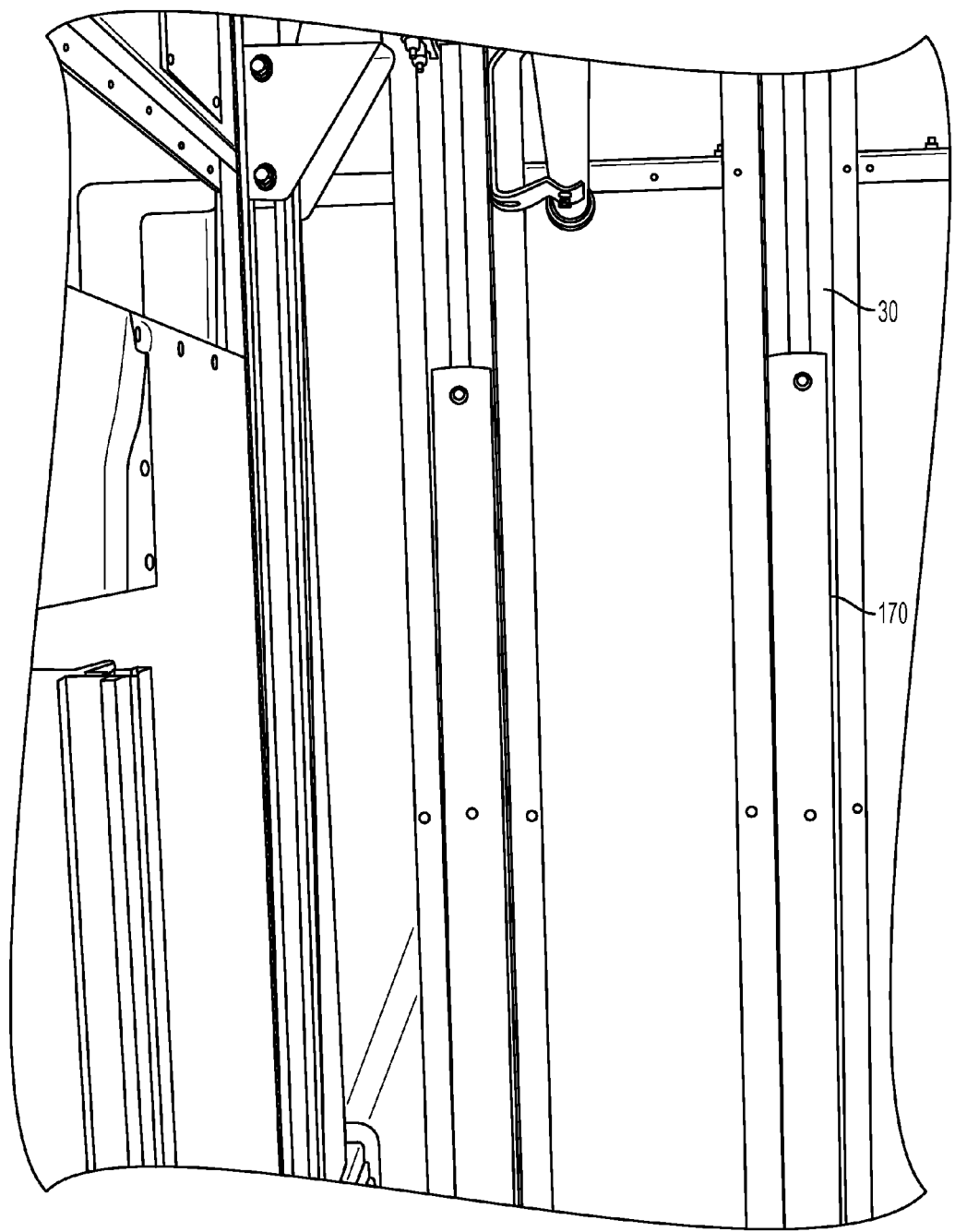

FIG. 26 is an image of bumpers attached to support posts, as described herein.

The use of the discontinuous rendering of the support posts depicted in FIGS. 2-16 represents indeterminate length.

DETAILED DESCRIPTION OF THE INVENTION

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "a support post" can include two or more such support posts unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

In one embodiment, and with reference to FIGS. 1-26, the invention relates to a system 10 for storing cargo within a vehicle enclosure 20 having a plurality of walls 25. In one aspect, the system 10 for storing cargo comprises a plurality of support posts 30. In another aspect, the system 10 for storing cargo comprises means for selectively securing each support post 30 of the plurality of support posts within the vehicle enclosure 20. In a further aspect, the system 10 for storing cargo comprises means for retaining the cargo within the vehicle enclosure 20.

In one aspect, and with reference to FIG. 2-16, each support post 30 of the plurality of support posts can have a longitudinal length L. It is contemplated that the length L of each support post 30 can be any length appropriate for positioning within the vehicle enclosure 20.

In another aspect, the plurality of support posts 30 can comprise, for example and without limitation, extruded metal, extruded reinforced resin, extruded plastic, and the like. Alternatively, the plurality of support posts 30 can comprise roll-formed strip metal. However, it is contemplated that any materials commonly used for structural supports can be used to manufacture the plurality of support posts 30.

As shown in FIGS. 2-16, in a further aspect, each support post 30 of the plurality of support posts can comprise a first mounting portion 40 and a second mounting portion 60. In this aspect, the first mounting portion 40 and the second mounting portion 60 can extend along a common cross-sectional longitudinal axis A.

In an additional aspect, the first mounting portion 40 and the second mounting portion 60 can each comprise a first side wall 42, 62 extending substantially parallel to the cross-sectional longitudinal axis A. In a further aspect, the first mounting portion 40 and the second mounting portion 60 can each comprise a second side wall 44, 64 extending substantially parallel to the cross-sectional longitudinal axis A. In still a further aspect, the first mounting portion 40 and the second mounting portion 60 can each comprise a base wall 46, 66 extending substantially perpendicular to the cross-sectional longitudinal axis A. In this aspect, the first side wall 42, the second side wall 44, and the base wall 46 of the first mounting portion 40 can cooperate to define a U-shaped receiving channel 48. Similarly, the first side wall 62, the second side wall 64, and the base wall 66 of the second mounting portion 60 can cooperate to define a U-shaped receiving channel 68. It is contemplated that the U-shaped receiving channel 48 of the first mounting portion 40 can have a cross-sectional area substantially equal to a cross-sectional area of the U-shaped receiving channel 68 of the second mounting portion 60. Alternatively, the cross-sectional area of the receiving channel 48 of the first mounting portion 40 can be substantially different from the cross-sectional area of the receiving channel 68 of the second mounting portion 60.

Figure 3:
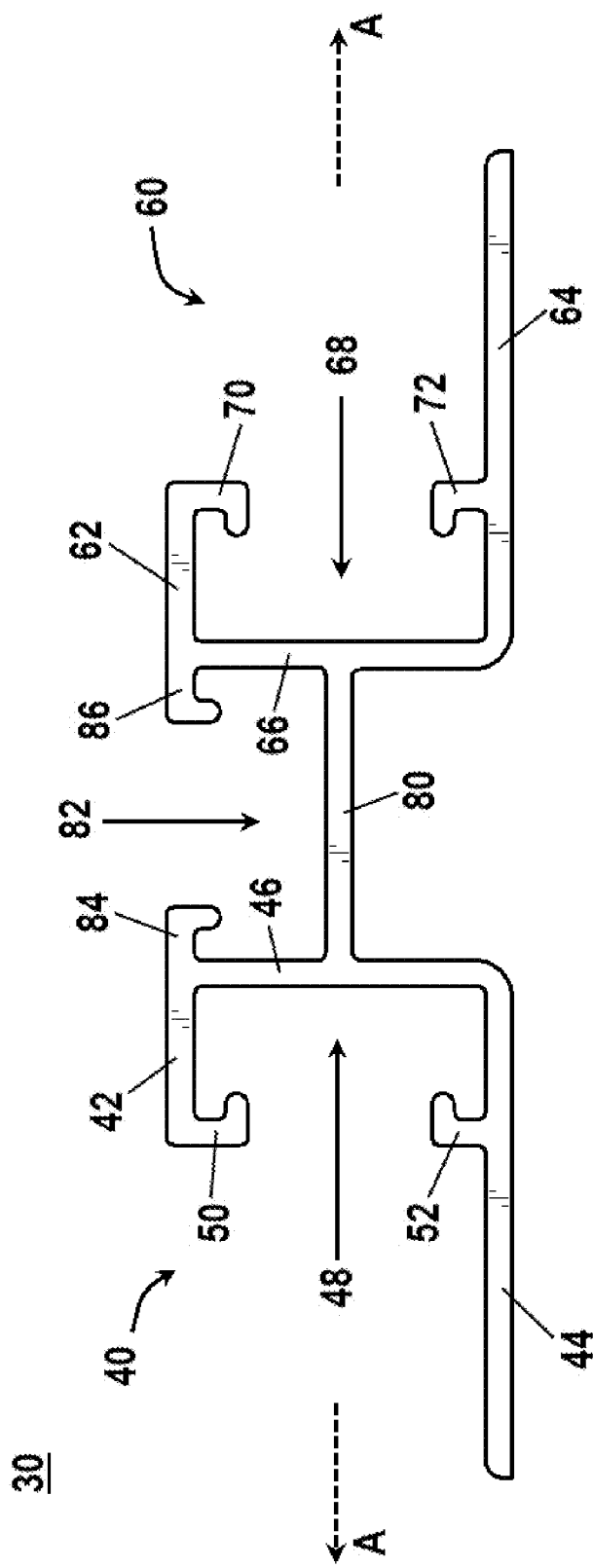
FIG. 3 is an enlarged front end view of the support post of FIG. 2, the back end view being a minor image thereof.
Figure 4:
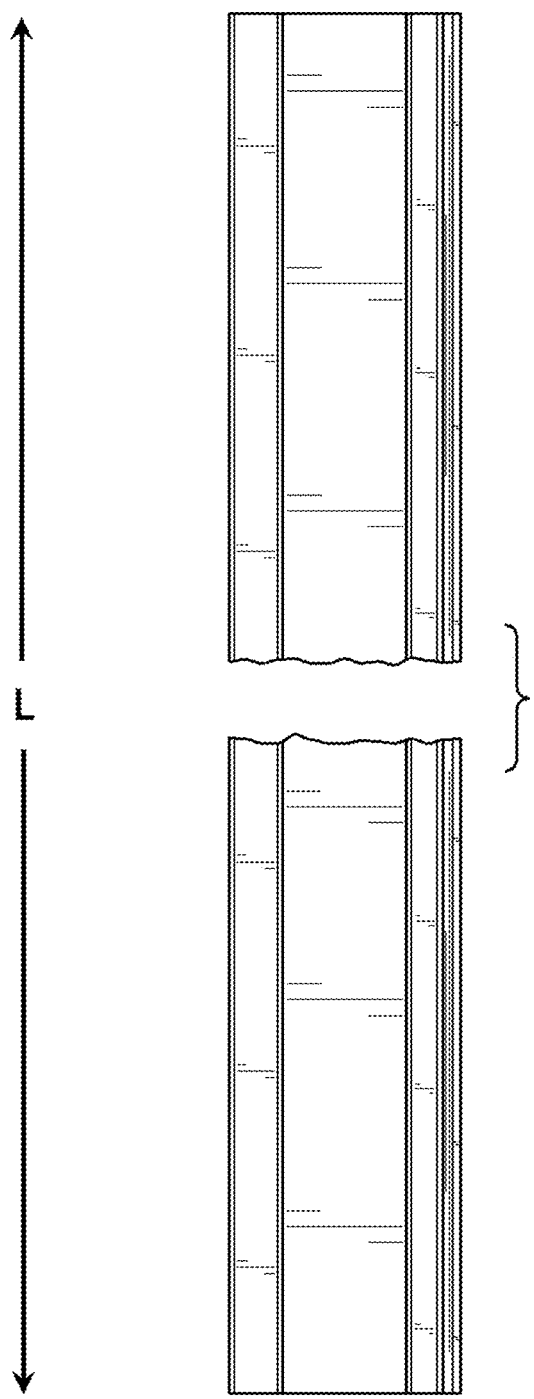
FIG. 4 is a right side view of the support post of FIG. 2, the left side view being a minor image thereof.
Figure 5:
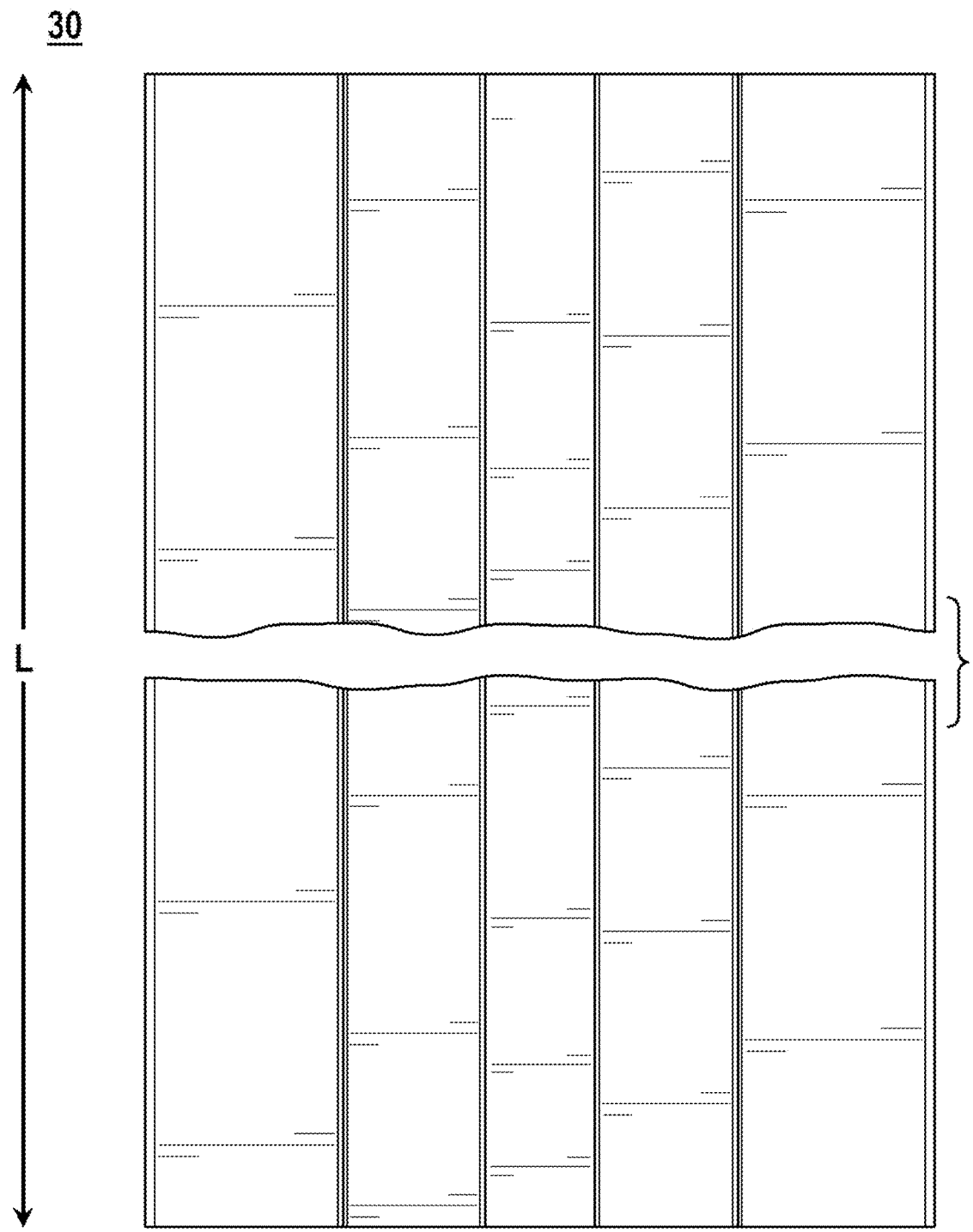
FIG. 5 is an enlarged top view of the support post of FIG. 2.
Figure 6:
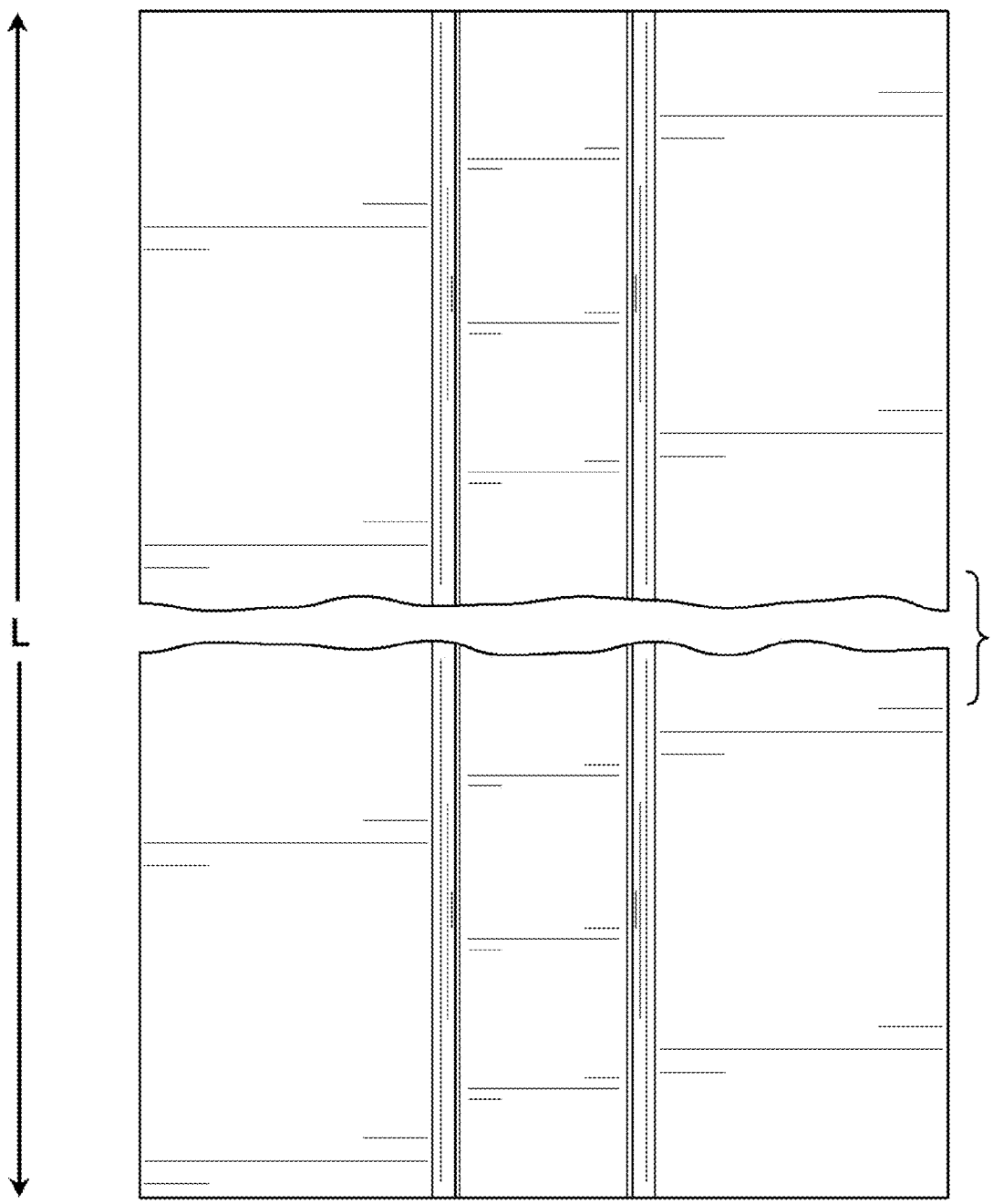
FIG. 6 is an enlarged bottom view of the support post of FIG. 2.
Figure 7:
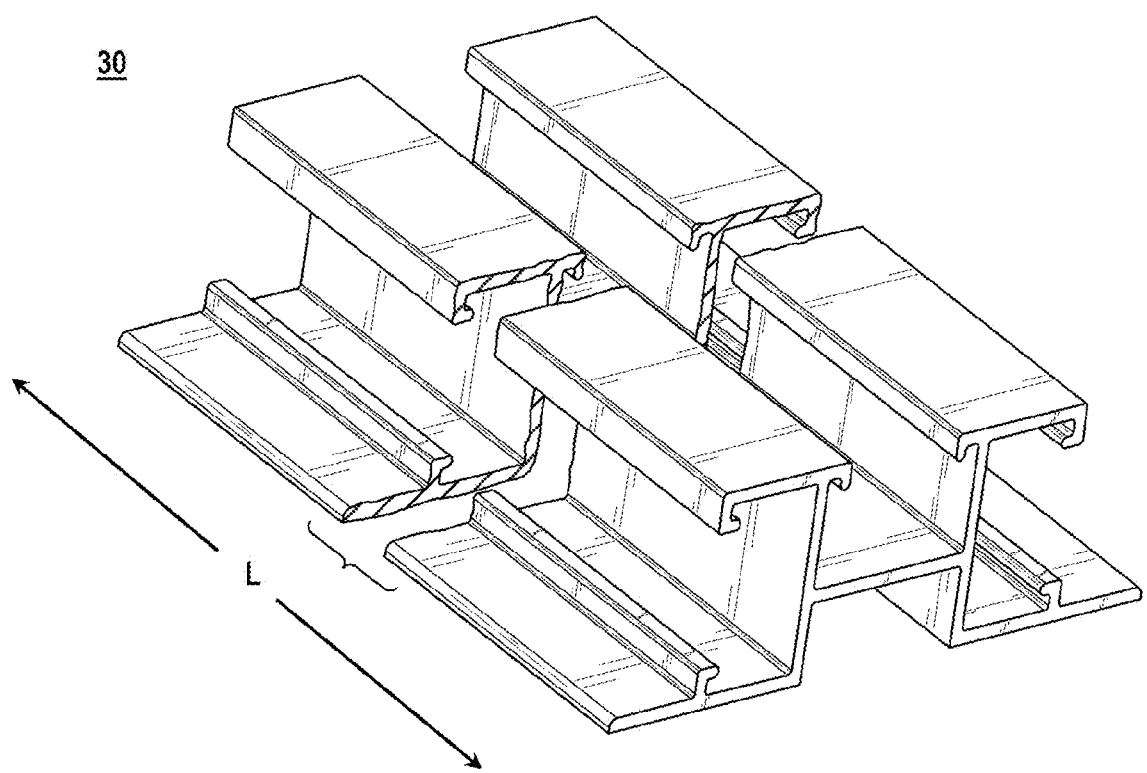
FIG. 7 is a perspective view of another embodiment of a support post for use in the exemplary system of FIG. 1, as described herein.
Figure 8:
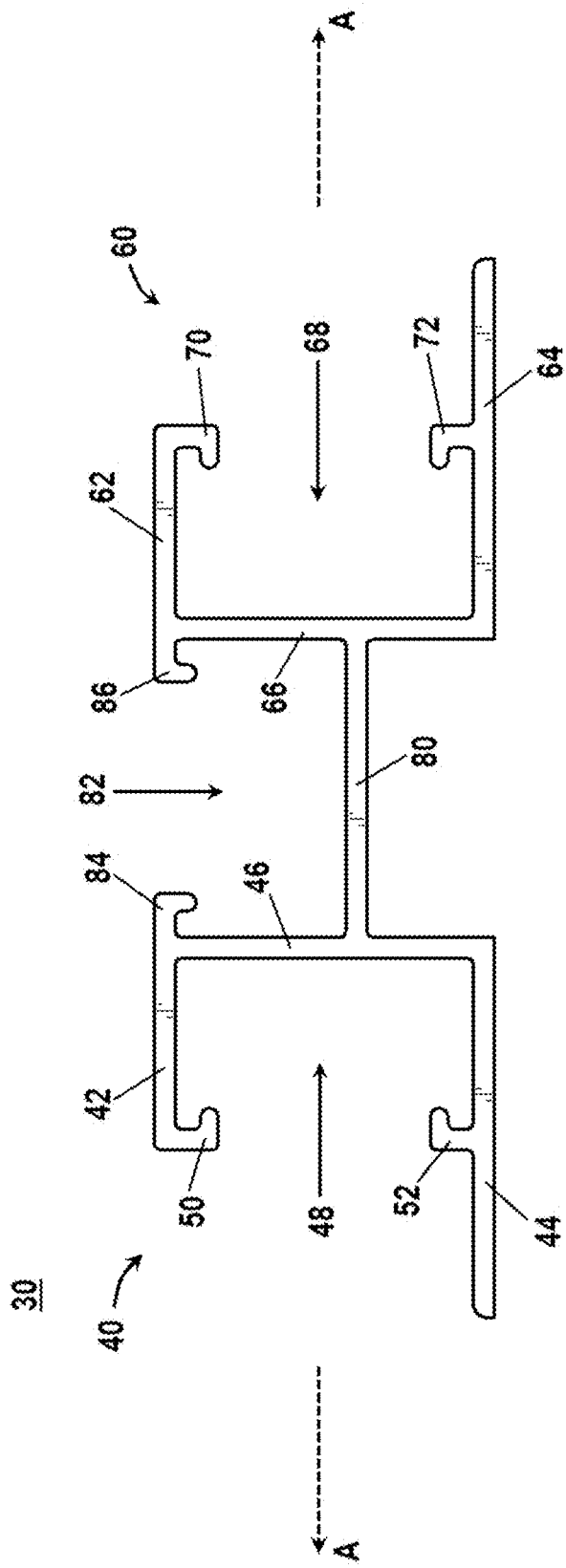
FIG. 8 is an enlarged front end view of the support post of FIG. 7, the back end view being a minor image thereof.
Figure 9:
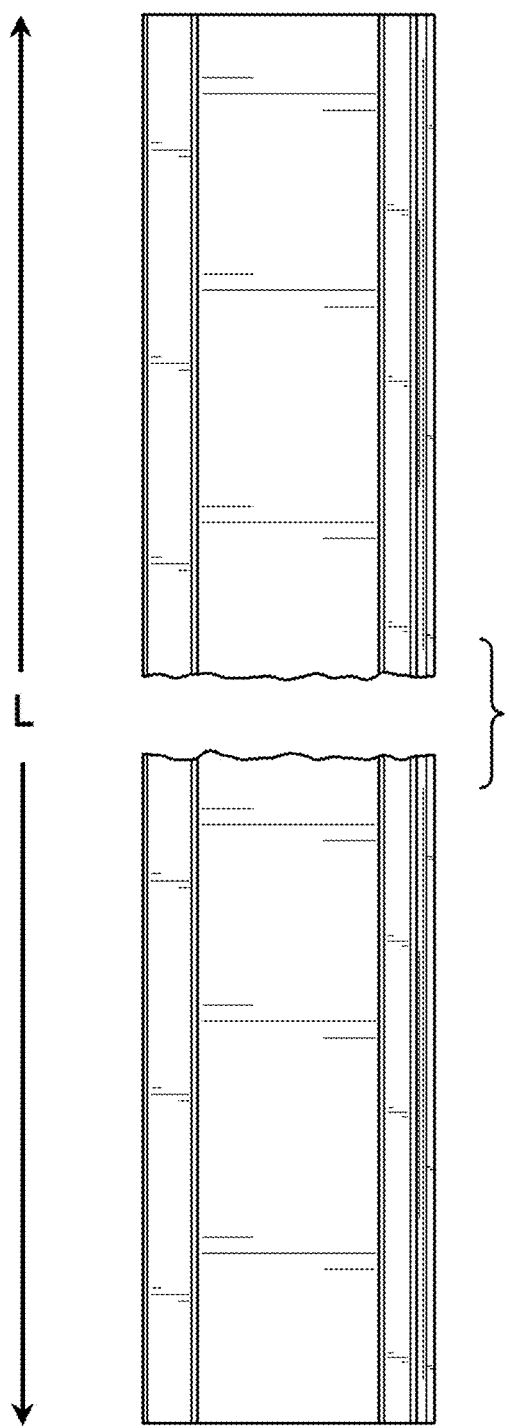
FIG. 9 is a right side view of the support post of FIG. 7, the left side view being a minor image thereof.
Figure 10:
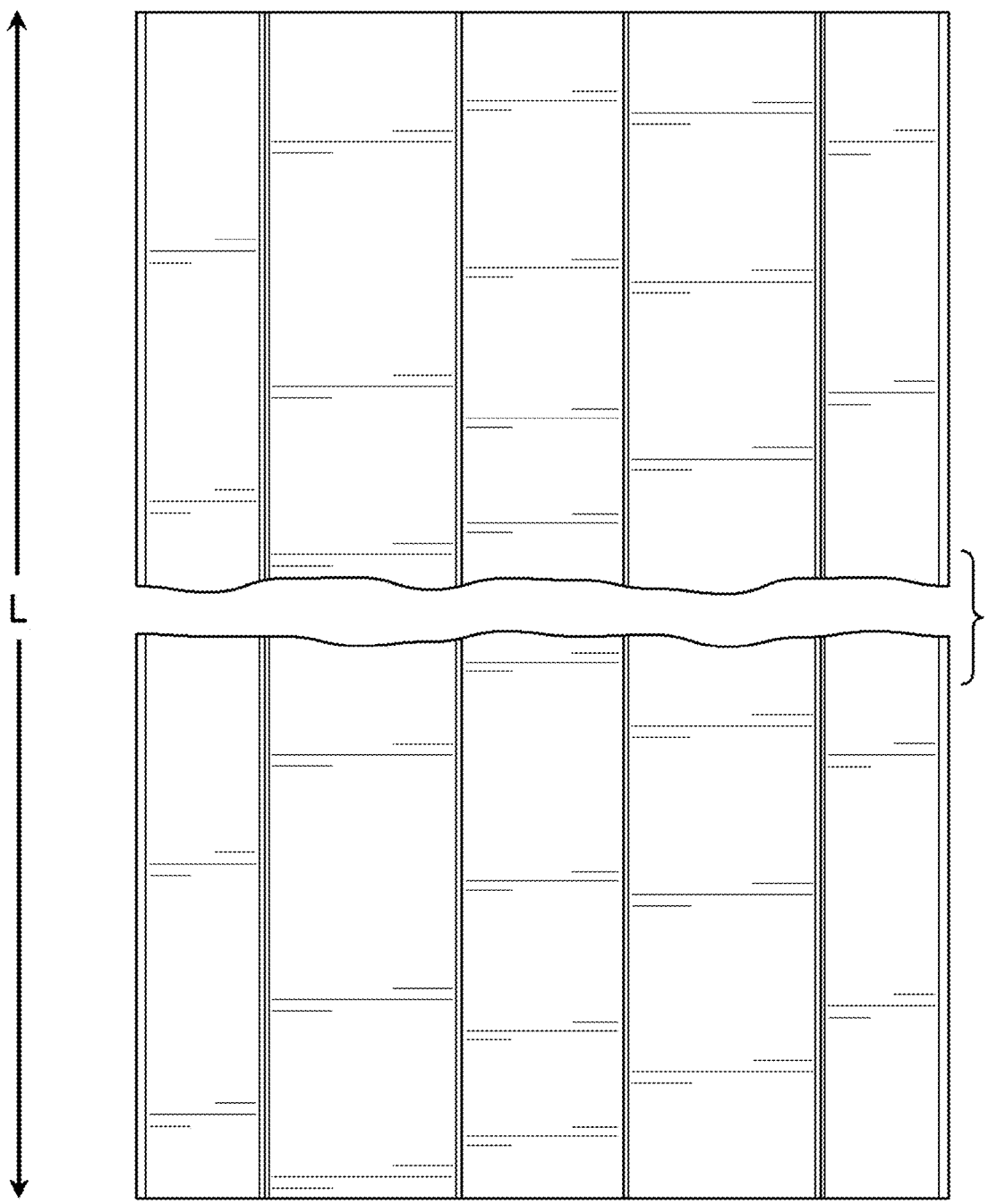
FIG. 10 is an enlarged top view of the support post of FIG. 7.
Figure 11:
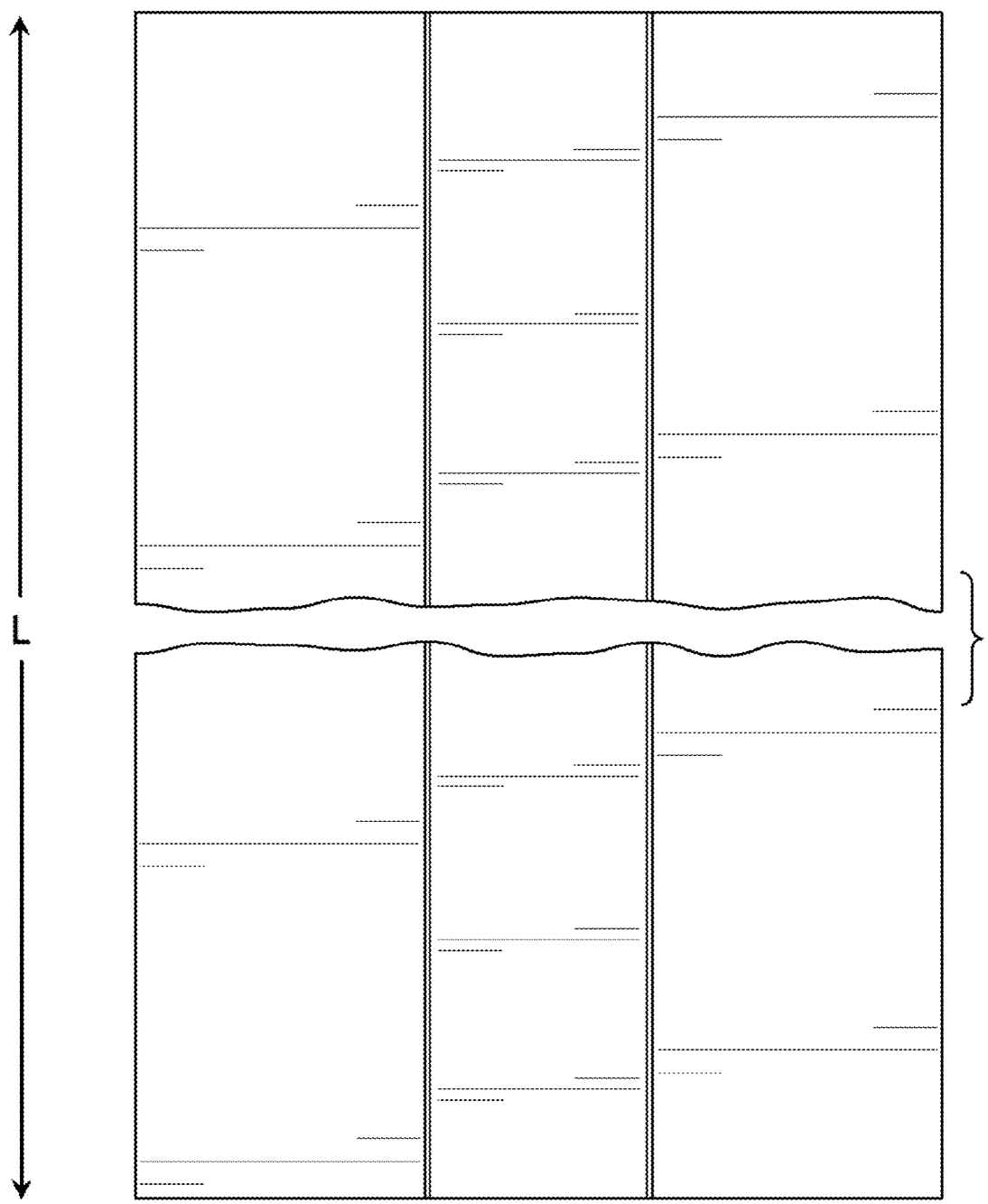
FIG. 11 is an enlarged bottom view of the support post of FIG. 7.
Figure 12:
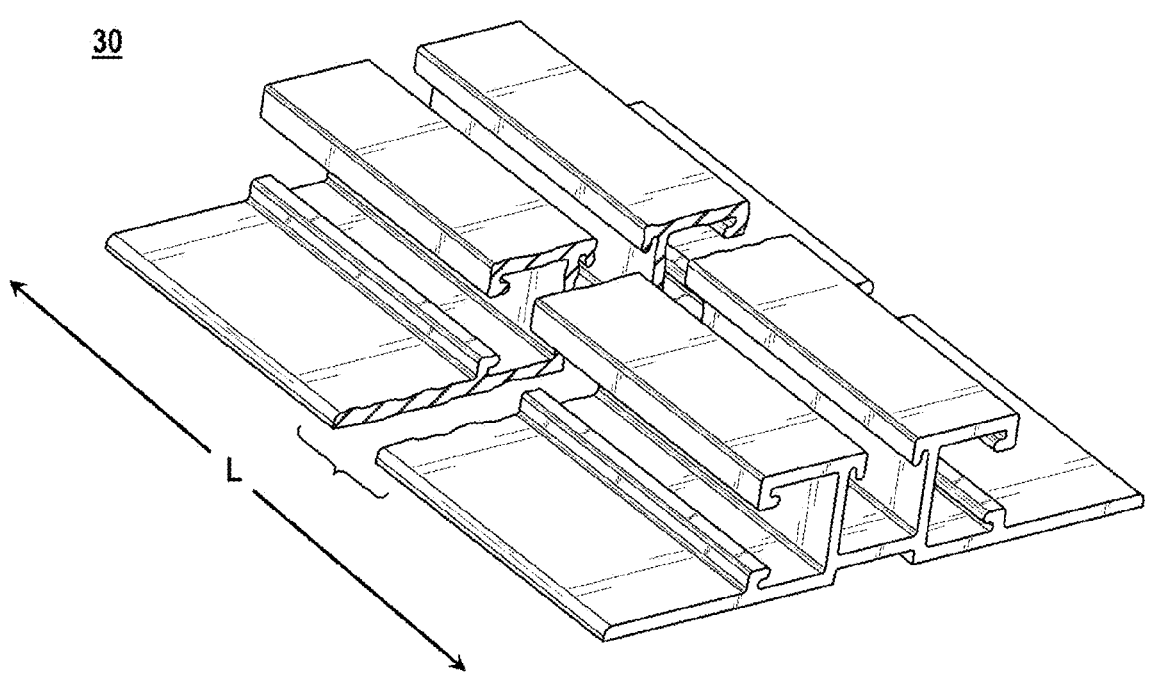
FIG. 12 is a perspective view of an alternative embodiment of a support post of another embodiment of a support post for use in the exemplary system of FIG. 1, as described herein.
Figure 13:
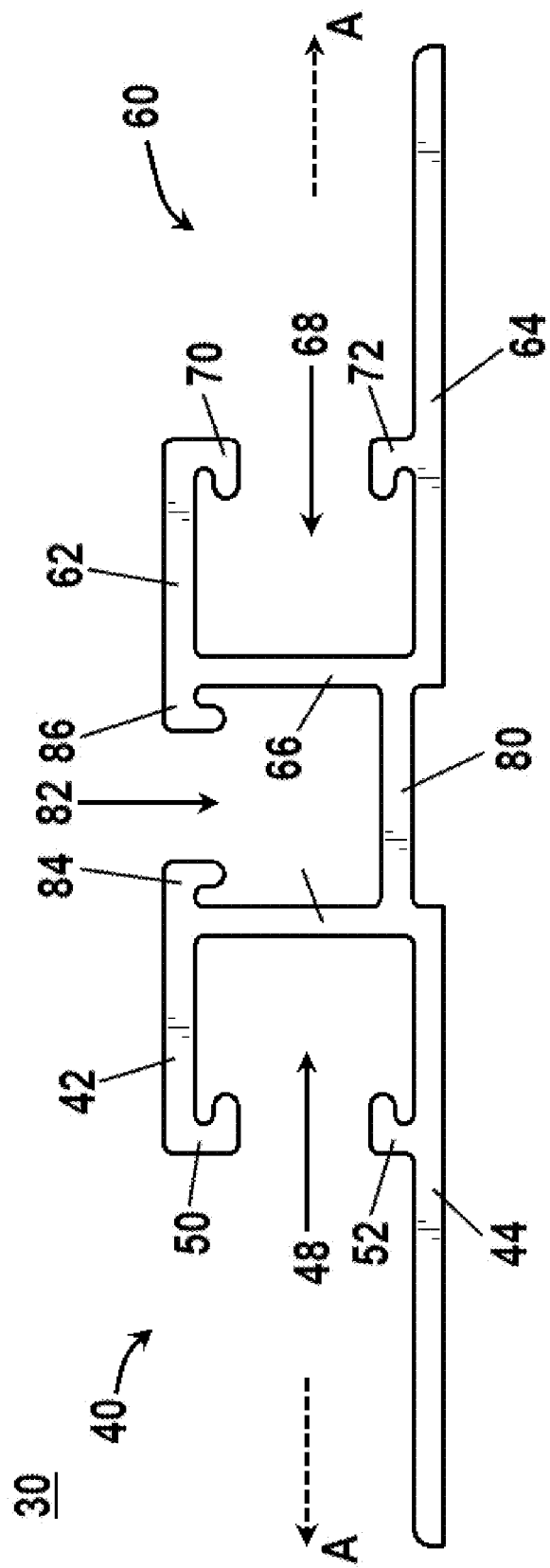
FIG. 13 is an enlarged front end view of the support post of FIG. 12, the back end view being a mirror image thereof.
Figure 14:
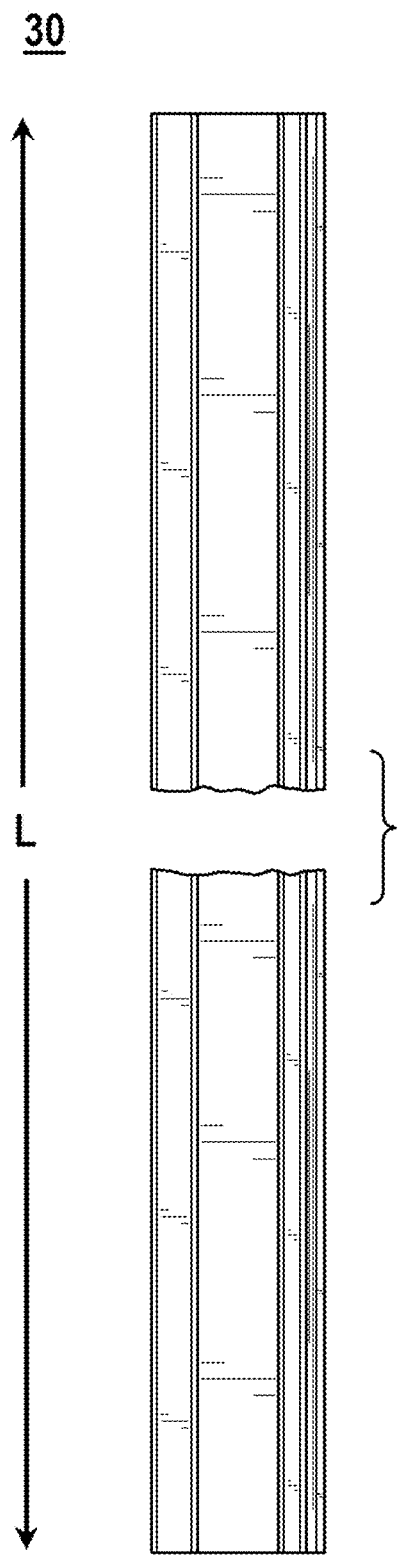
FIG. 14 is a right side view of the support post of FIG. 12, the left side view being a minor image thereof.
Figure 15:
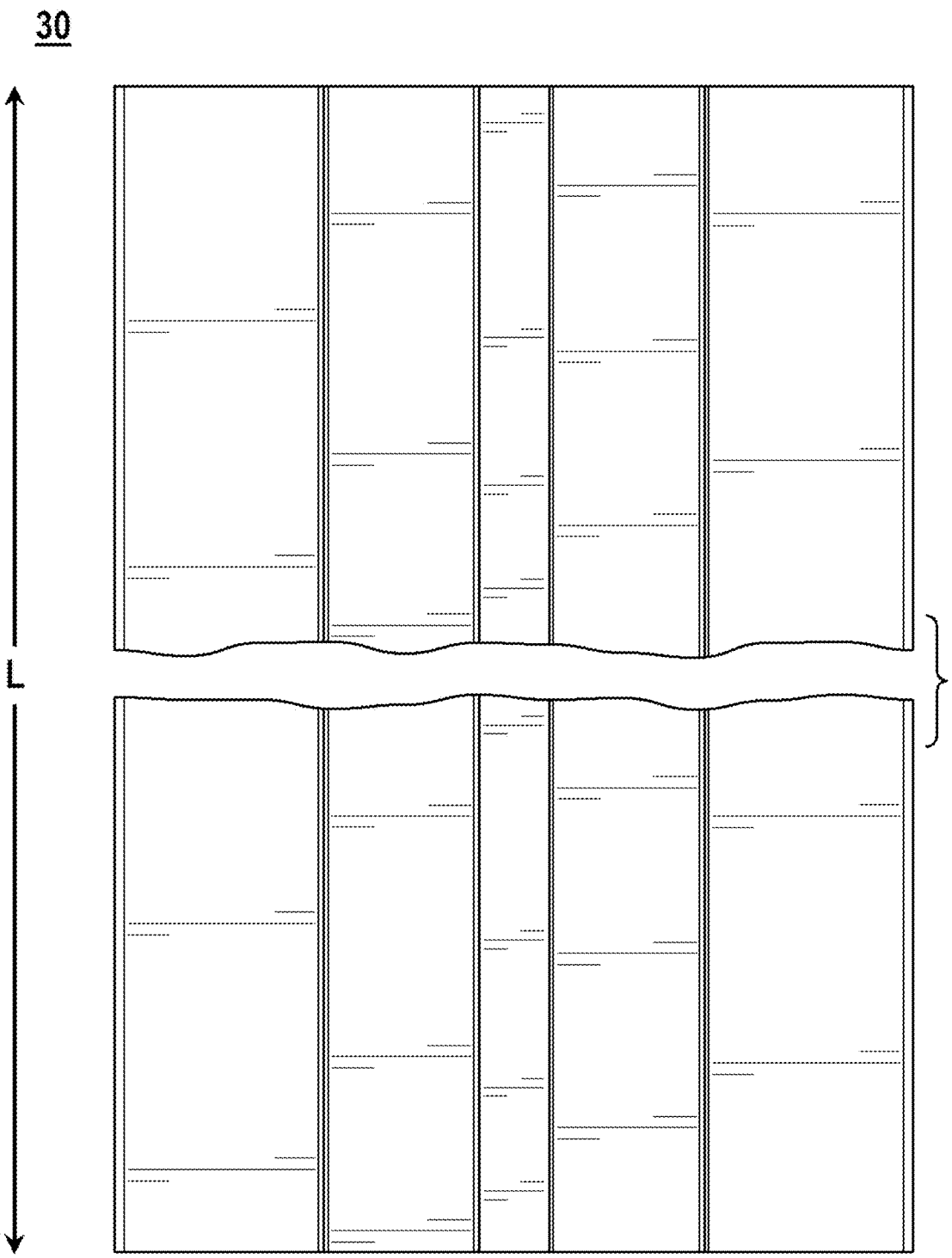
FIG. 15 is an enlarged top view of the support post of FIG. 12.
Figure 16:
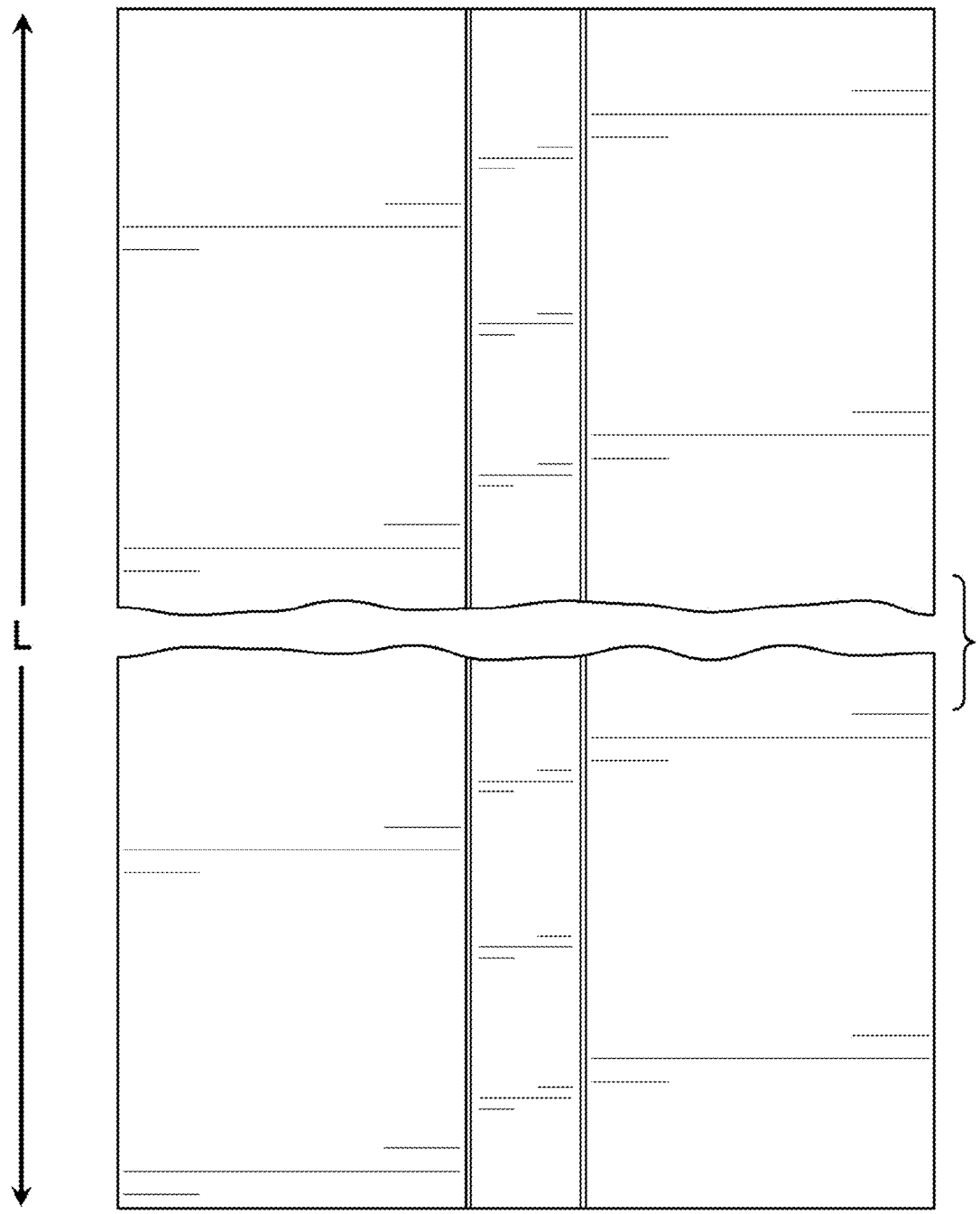
FIG. 16 is an enlarged bottom view of the support post of FIG. 12.

Optionally, in a further aspect, the first mounting portion 40 and the second mounting portion 60 can each comprise a first flange member 50, 70 extending inwardly from the first side wall 42, 62 toward its respective receiving channel 48, 68, thereby further defining the receiving channel. In this aspect, as shown in FIGS. 3, 8, and 13, it is contemplated that the first flange member 50, 70 can be substantially L-shaped. Optionally, in an additional aspect, the first mounting portion 40 and the second mounting portion 60 can each comprise a second flange member 52, 72 extending inwardly from the second side wall 44, 64 toward its respective receiving channel 48, 68, thereby further defining the receiving channel. In this aspect, as shown in FIGS. 3, 8, and 13, it is contemplated that the second flange member 52, 72 can be substantially L-shaped. In a further aspect, the second flange member 52, 72 can optionally be positioned in opposition to the first flange member 50, 70.

In one aspect, it is contemplated that the first flange member 50 and the second flange member 52 of the first mounting portion 40 of each support post 30 can be substantially equally spaced from the base wall 46 of the first mounting portion. It is further contemplated that the first flange member 70 and the second flange member 72 of the second mounting portion 60 of each support post 30 can be substantially equally spaced from the base wall 66 of the second mounting portion. Alternatively, the first flange members 50, 70 of the respective mounting portions 40, 60 can be substantially offset from the second flange members 52, 72 of the respective mounting portions along the common cross-sectional longitudinal axis A.

In another aspect, each support post 30 of the plurality of support posts can comprise a connecting member 80 for joining the first and second mounting portions 40, 60. In this aspect, the connecting member 80 can be connected to and positioned therebetween the base walls 46, 66 of the first and second mounting portions 40, 60. In an additional aspect, the connecting member 80 can extend substantially parallel to the common cross-sectional longitudinal axis A of the first and second mounting portions 40, 60. In a further aspect, at least portions of the base walls 46, 66 of the first and second mounting portions 40, 60 can cooperate with the connecting member 80 to define at least one central receiving channel 82. In this aspect, the at least one central receiving channel 82 can comprise one central receiving channel. Alternatively, the at least one central receiving channel 82 can comprise two opposing central receiving channels. Thus, it is specifically contemplated that each support post 30 can comprise two pairs of two opposed receiving channels. It is further contemplated that each central receiving channel 82 can have a cross-sectional area that is substantially equal to the cross-sectional areas of the receiving channels 48, 68 of the first and second mounting portions 40, 60. It is still further contemplated that the cross-sectional area of each central receiving channel 82 can be substantially different from the cross-sectional areas of the receiving channels 48, 68 of the first and second mounting portions 40, 60.

Optionally, in an additional aspect, each support post 30 of the plurality of support posts can further comprise a first central flange member 84 and a second central flange member 86. In this aspect, the first central flange member 84 can extend inwardly from the base wall 46 of the first mounting portion 40 toward the at least one central receiving channel 82, thereby further defining a central receiving channel of the at least one central receiving channel. Additionally, the second central flange member 86 can extend inwardly from the base wall 66 of the second mounting portion 60 toward the at least one central receiving channel 82, thereby further defining a central receiving channel of the at least one central receiving channel. In another aspect, it is contemplated that the first and second central flange members 84, 86 of each support post 30 can be substantially equally spaced from the connecting member 80. Alternatively, the first central flange member 84 of each support post 30 can be substantially offset from the second central flange member 86 of each support post relative to the common cross-sectional longitudinal axis A.

In another aspect, the receiving channels 48, 68, 82 of each support post 30 can extend along at least a portion of the length L of the support post. In this aspect, it is contemplated that the receiving channels 48, 68, 82 of each support post 30 can extend along substantially the entire length L of the support post.

Figure 17A:
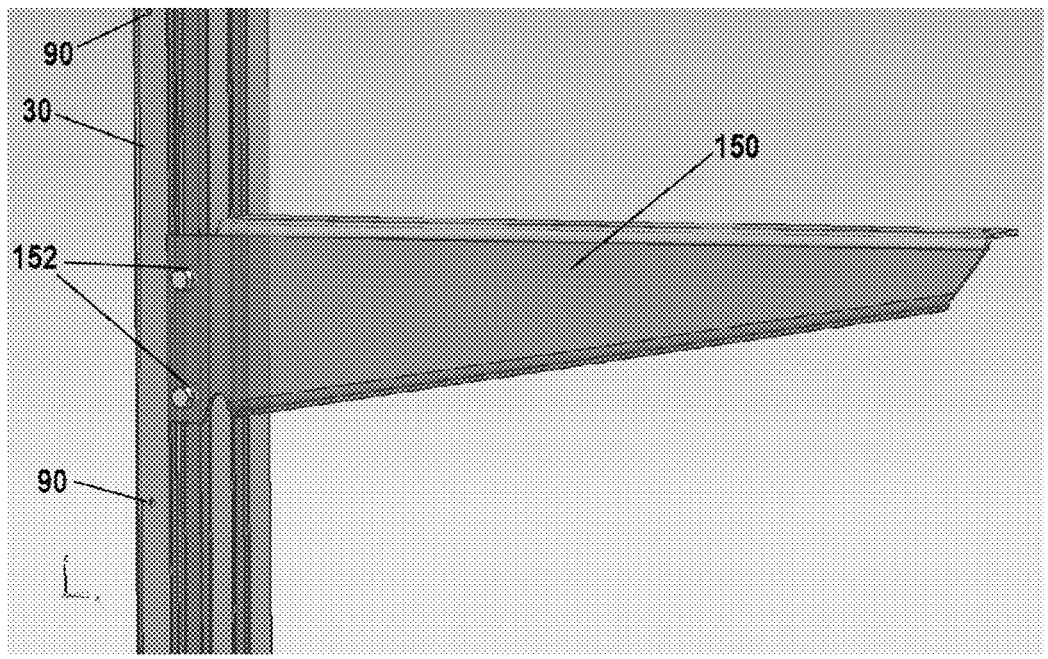
FIG. 17A is a side view of a shelf support arm attached to a support post, as described herein.

In a further aspect, as shown in FIG. 17A, the second side walls 44, 64 of the first and second mounting portions 40, 60 of each support post 30 of the plurality of support posts can define a plurality of bores 90. In this aspect, the plurality of bores 90 can be spaced along the longitudinal length L of each support post 30. It is contemplated that the plurality of bores 90 can be substantially evenly spaced along the longitudinal length L of each support post 30. Optionally however, the plurality of bores 90 can be spaced as desired and/or required by the installation design.

In one aspect, the means for selectively securing each support post 30 of the plurality of support posts within the vehicle enclosure 20 can comprise a plurality of fasteners. In this aspect, each fastener of the plurality of fasteners can be configured for selective insertion therein at least one bore 90 of the plurality of bores spaced along the longitudinal length L of each support post 30. In another aspect, the plurality of fasteners can comprise at least one of, for example and without limitation, spring clips, tie rings, knobs, screws, nuts, bolts, washers, clamps, anchors, and the like.

In a further aspect, it is contemplated that the plurality of support posts 30 can comprise at least one peripheral support post positioned proximate at least one wall 25 of the plurality of walls of the vehicle enclosure 20. In still a further aspect, it is contemplated that the plurality of support posts 30 can comprise at least one inner support post spaced from the plurality of walls 25 of the vehicle enclosure 20 toward a central portion of the vehicle enclosure.

Figure 1:
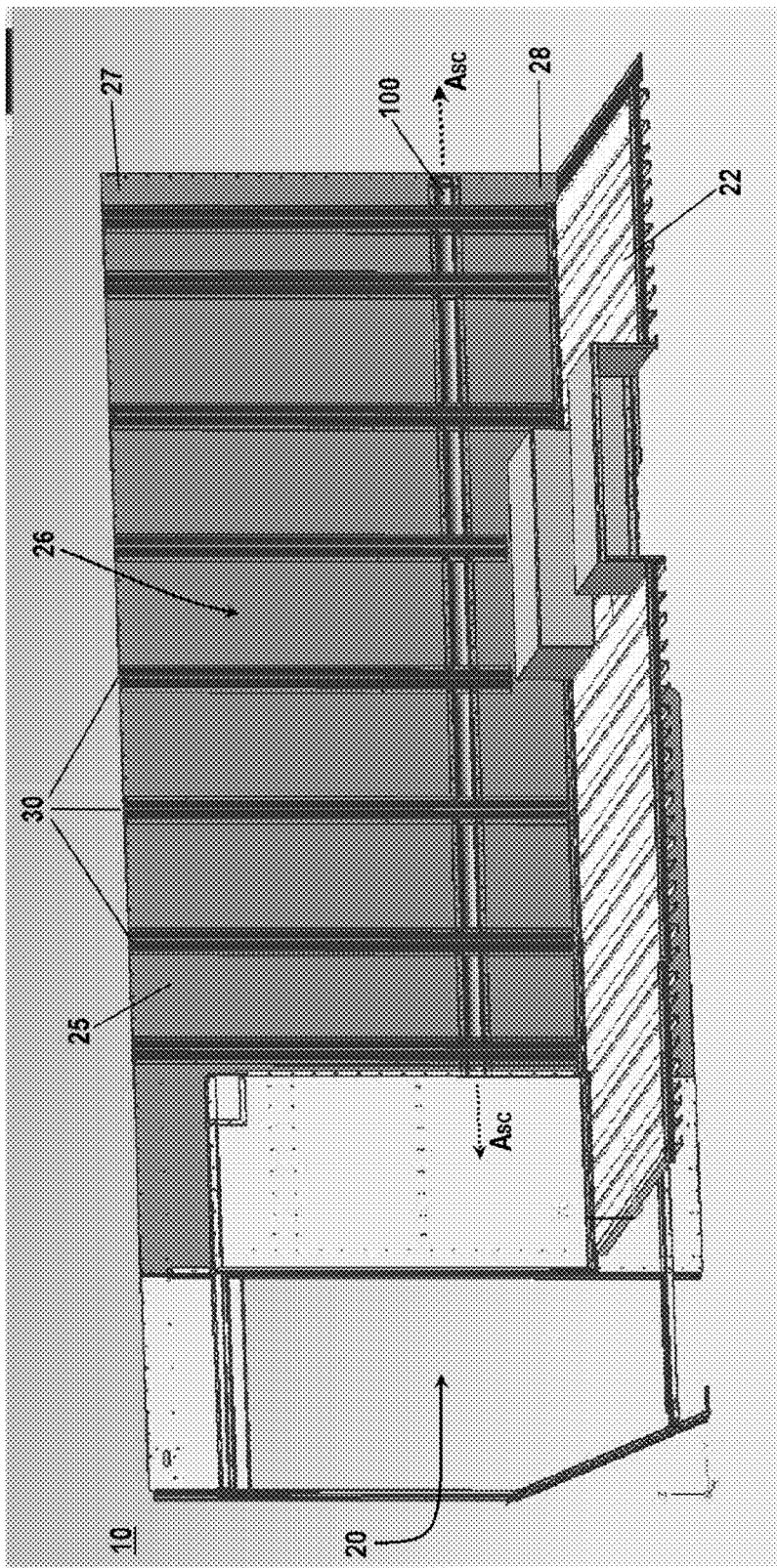
FIG. 1 is a partial perspective view of an embodiment of a system for storing cargo within a vehicle enclosure having a plurality of walls, as described herein.
Figure 2:
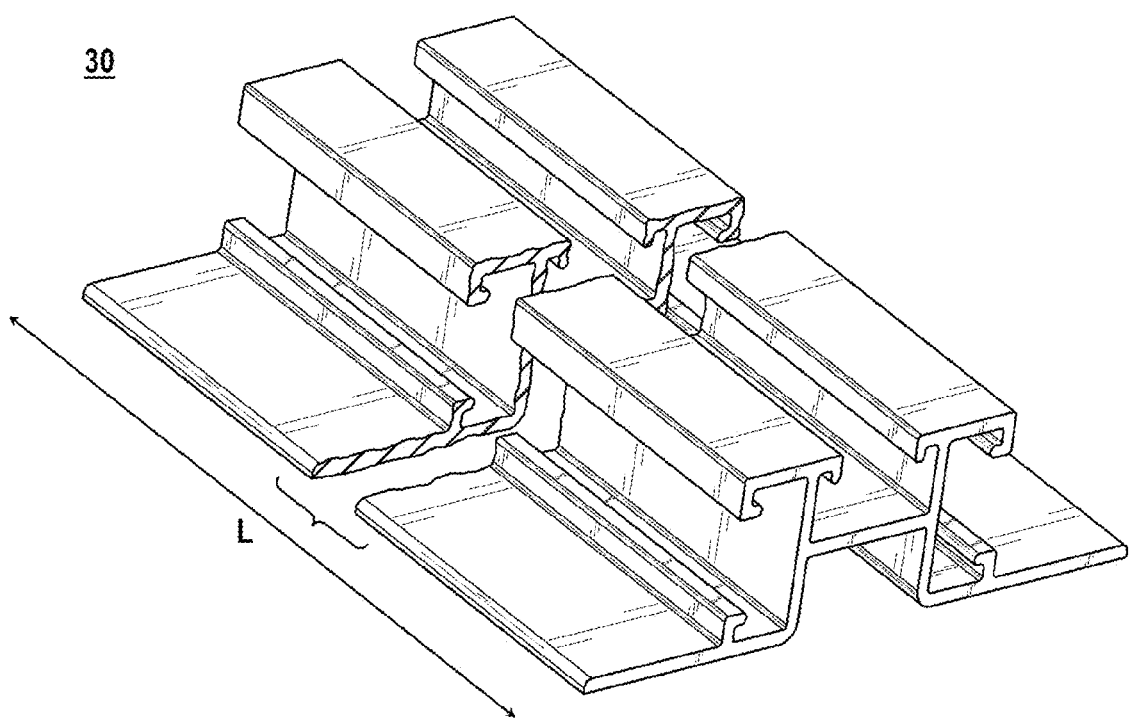
FIG. 2 is a perspective view of one embodiment of a support post for use in the exemplary system of FIG. 1, as described herein.

In another aspect, the means for selectively securing each support post 30 can further comprise at least one side channel 100 defined therein at least one support wall of the plurality of walls 25 of the vehicle enclosure 20. In this aspect, the at least one side channel 100 can be configured to receive a portion of the fasteners that are inserted therein the bores 90 of each peripheral support post. In an additional aspect, as shown in FIG. 1, the at least one side channel 100 can comprise a receiving side channel positioned intermediate a top portion 27 and a bottom portion 28 of the at least one support wall of the plurality of walls 25 of the vehicle enclosure 20. In a further aspect, the at least one side channel 100 can comprise a first side channel positioned proximate the top portion 27 of the at least one support wall of the plurality of walls 25 of the vehicle enclosure 20. In still a further aspect, the at least one side channel 100 can comprise a second side channel positioned proximate the bottom portion 28 of the at least one support wall of the plurality of walls 25 of the vehicle enclosure 20. It is contemplated that additional conventional support posts can be attached as described to the at least one side channel to cooperate with the disclosed elements of the system 10.

In one exemplary aspect, as shown in FIG. 1, the at least one support wall of the plurality of walls 25 of the vehicle enclosure 20 can comprise an inner surface 26 positioned substantially within a plane. In this aspect, it is contemplated that the receiving side channel can have a longitudinal axis $A_{SC}$ that is substantially co-axial with the inner surface 26 of the at least one support wall. It is further contemplated that the receiving side channel can be positioned substantially flush with the inner surface 26 of the at least one support wall.

In another aspect, and with reference to FIG. 20, each support post 30 of the plurality of support posts can be secured thereto a floor 22 of the vehicle enclosure. In this aspect, each support post 30 of the plurality of support posts can comprise a footer portion for attachment thereto the floor 22 of the vehicle enclosure 20. It is contemplated that the footer portion can be coupled to a vertical stiffener for strengthening the attachment of the footer portion to the floor 22 of the vehicle enclosure 20. In an additional aspect, each support post 30 of the plurality of support posts can be secured thereto a ceiling 24 of the vehicle enclosure 20. In this aspect, each support post 30 of the plurality of support posts can comprise a header portion for attachment thereto the ceiling 24 of the vehicle enclosure 20. It is contemplated that the header portion can be coupled to a vertical stiffener for strengthening the attachment of the header portion to the ceiling 24 of the vehicle enclosure 20. It is further contemplated that the header and footer portions of each support post 30 enable the plurality of support posts to be retro-fit to existing beds within vehicles. It is still further contemplated that additional conventional support posts can be attached as described to the floor 22 and/or ceiling 24 of the vehicle enclosure 20 to cooperate with the disclosed elements of the system 10.

In one aspect, the means for retaining the cargo can comprise a plurality of fasteners. In this aspect, the receiving channels 48, 68 of the first and second mounting portions 40, 60 and the central receiving channel 82 of each support post 30 can be configured to selectively receive the plurality of fasteners. In another aspect, the plurality of fasteners can comprise at least one of, for example and without limitation, spring clips, tie rings, knobs, screws, nuts, bolts, washers, clamps, anchors, and the like. However, it is contemplated that any selectively removable attachment or fastening means can be used to attach the means for retaining cargo thereto a receiving channel 48, 68, 82 of at least one support post 30 of the plurality of support posts. It is contemplated that the means for retaining cargo can be secured in a desired position within a receiving channel 48, 68, 82 of a support post 30 by tightening a fastener or other attachment means within the channel. It is further contemplated that the means for retaining cargo can be selectively moved along the length of the receiving channel 48, 68, 82 by loosening and re-tightening the fastener or other attachment means within the channel. It is still further contemplated that the means for retaining cargo can be selectively transported to a desired receiving channel on the same support post or a different support post among the plurality of support posts 30 by loosening the fastener or other attachment means and then re-tightening the fastener or other attachment means following its insertion therein the desired receiving channel. It is still further contemplated that the plurality of fasteners and other attachment means can be used to attach the means for retaining cargo to two or more support posts of the plurality of support posts in a desired configuration.

In a further aspect, it is contemplated that the plurality of fasteners of the means for retaining the cargo can be interchangeable with the plurality of fasteners of the means for selectively securing each support post 30 within the vehicle enclosure 20.

In an additional aspect, each receiving channel 48, 68, 82 of the plurality of support posts 30 can comprise detention slots for holding the plurality of fasteners of the means for retaining cargo in a desired vertical position within the receiving channel. It is contemplated that, when the plurality of fasteners are used to attach the means for retaining cargo to two or more support posts of the plurality of support posts 30, the detention slots can be used to ensure that the means for retaining cargo is secured in a level horizontal position.

Optionally, as shown in FIG. 21, the means for retaining the cargo within the vehicle enclosure 20 can further comprise a cargo net 110. In one aspect, the cargo net 110 can comprise means for receiving a portion of the plurality of fasteners. In this aspect, the means for receiving a portion of the plurality of fasteners can comprise a plurality of bores defined therein an outer portion of the cargo net.

With reference to FIGS. 19 and 22, the means for retaining the cargo within the vehicle enclosure 20 optionally can further comprise at least one support shelf 120. In one aspect, as shown in FIG. 19, a plurality of horizontally positioned and spaced support posts, which can optionally be conventional support posts, can extend between respective adjacent and opposing substantially vertical support posts. In this aspect, it is contemplated that the plurality of horizontally positioned and spaced support posts provides for multiple attachment points for a flanged edge portion of a substantially vertical panel to be coupled to the plurality of horizontally positioned and spaced support posts. In this aspect, it is contemplated that the mounted vertical panel would extend substantially perpendicular to both the wall and floor. In one aspect, the opposing end edges of at least one support shelf can be coupled or attached to a pair of adjacent support posts and the substantially vertical panel to form a shelf that can optionally be positioned at desired angles with respect to the floor of the vehicle. In one example, the shelf can be positioned substantially parallel to the floor of the vehicle.

In one aspect, as shown in FIG. 23, the at least one support shelf 120 can comprise a folding support shelf. In this aspect, the folding support shelf can be selectively moveable about and between a first position and a second position. It is contemplated that the first position can comprise an upright position proximate a wall of the vehicle enclosure. It is further contemplated that the second position can comprise a horizontal position such that the cargo can be positioned on a top surface of the folding support shelf. In an additional aspect, the at least one support shelf 120 can comprise means for receiving a portion of the plurality of fasteners. In this aspect, the means for receiving a portion of the plurality of fasteners can comprise a plurality of bores defined therein an outer portion of the at least one support shelf 120. In a further aspect, the at least one support shelf 120 can be expandable.

Optionally, the means for retaining the cargo within the vehicle enclosure 20 can further comprise a bin 130, which can be formed from bin shelving, as depicted in FIG. 24. In one aspect, the bin 130 can comprise means for receiving a portion of the plurality of fasteners. In this aspect, the means for receiving a portion of the plurality of fasteners can comprise a plurality of bores defined therein an outer portion of the bin 130.

As depicted in FIG. 25, the means for retaining the cargo within the vehicle enclosure 20 can optionally further comprise a garment rack 140. In one aspect, the garment rack 140 can comprise means for supporting conventional clothing and/or clothing hangers. In this aspect, the means for supporting conventional clothing and/or clothing hangers can comprise a pipe or other elongate member. In another aspect, the garment rack 140 can comprise means for receiving a portion of the plurality of fasteners. In this aspect, the means for receiving a portion of the plurality of fasteners can comprise a plurality of bores defined therein a portion of the garment rack 140.

Figure 17B:
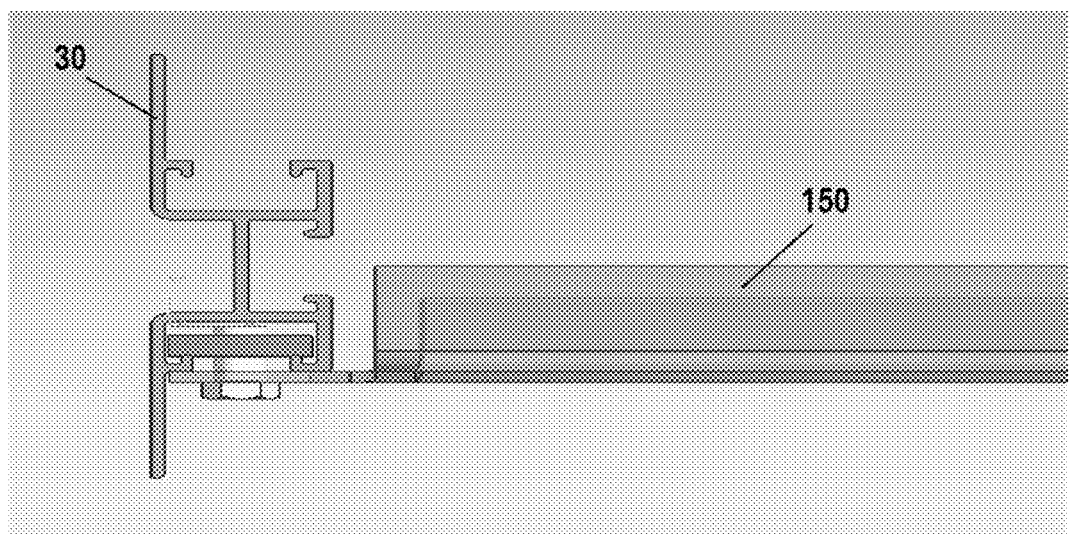
FIG. 17B is a top view of the shelf support arm and support post of FIG. 17A.

With reference to FIGS. 17A-17B, the means for retaining the cargo within the vehicle enclosure 20 can optionally further comprise at least one support arm 150. In one aspect, the at least one support arm 150 can be configured to support shelving, bins, racks, and other conventional storage means. In one aspect, the at least one support arm 150 can comprise means for receiving a portion of the plurality of fasteners. In this aspect, the means for receiving a portion of the plurality of fasteners can comprise a plurality of bores 152 positioned along a portion of the at least one support arm 150.

Figure 18A:
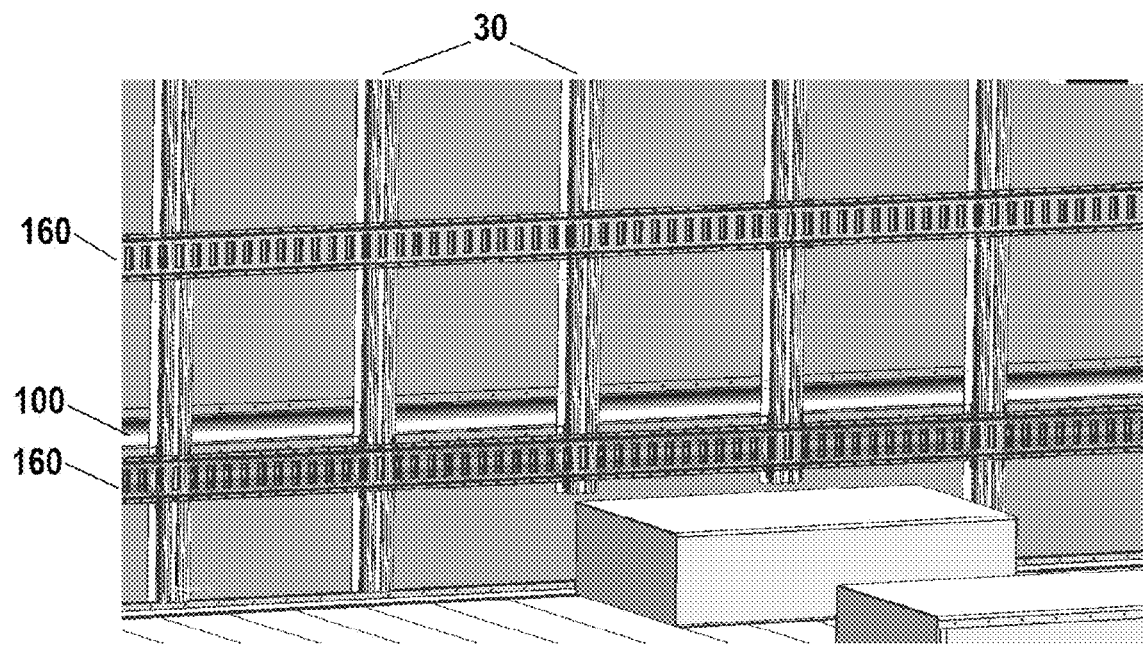
FIG. 18A is a perspective view of a cargo track attached to a plurality of support posts. In this non-limiting example, two cargo track are attached to the plurality of support posts so that the cargo tracks extend substantially parallel to each other and substantially parallel to the bottom floor of the vehicle, as described herein.
Figure 18B:
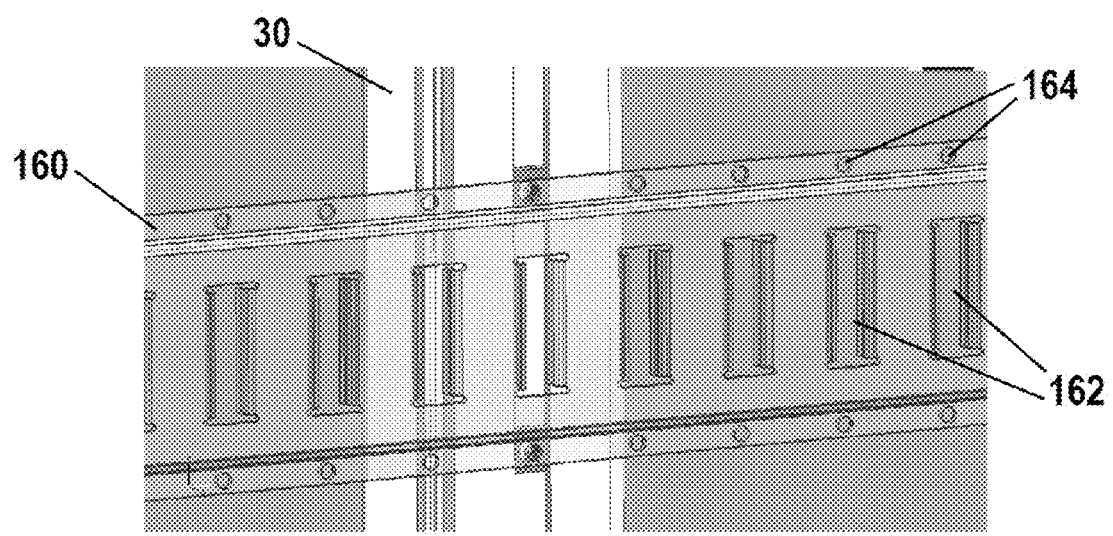
FIG. 18B is an enlarged perspective view of the cargo track of FIG. 18A.

With reference to FIGS. 18A-18B, the means for retaining the cargo within the vehicle enclosure 20 can optionally further comprise a cargo track 160 configured for positioning along at least a portion of a wall 25 of the vehicle enclosure. In one aspect, the cargo track 160 can comprise means for receiving a portion of the plurality of fasteners. In this aspect, the means for receiving a portion of the plurality of fasteners can comprise a plurality of slots 162 defined therein an inner portion of the cargo track 160 and/or a plurality of bores 164 defined therein an outer portion of the cargo track.

Optionally, as shown in FIG. 26, the means for retaining the cargo within the vehicle enclosure can further comprise at least one bumper 170 configured for positioning along at least a portion of the length L of a support post 30. In one aspect, the at least one bumper 170 can comprise means for receiving a portion of the plurality of fasteners. In this aspect, the means for receiving a portion of the plurality of fasteners can comprise a plurality of bores defined therein an inner portion of the at least one bumper 170.

It is contemplated that the means for retaining cargo can comprise any means commonly known for holding or supporting cargo or other items in a substantially stationary position.

It is contemplated that each receiving channel 48, 68, 82 of each support post 30 can receive the means for retaining the cargo at a range of vertical positions. It is further contemplated that each receiving channel 48, 68, 82 of each support post 30 can face in a different direction than the other receiving channels, thereby permitting the means for retaining the cargo to be received by the receiving channels of each support post in a variety of horizontal orientations. It is still further contemplated that the side channels 100 defined therein the walls 25 of the vehicle enclosure 20 permit selective movement of the peripheral support posts about and between a range of horizontal positions. It is yet further contemplated that, due to the flexibility in the horizontal and vertical positioning of the plurality of support posts 30 and the different orientations of the at least three receiving channels 48, 68, 82 of each support post, the means for retaining cargo can be attached thereto a receiving channel of one or more selected support posts at a desired vertical position and horizontal orientation.

In use, the disclosed system 10 can be employed in any conventional vehicle enclosure. Thus, it is contemplated that the system 10 can be employed within a new vehicle or retro-fit to a used vehicle. It is further contemplated that after the at least one side channel 100 is defined therein selected walls of the plurality of walls 25 of the vehicle enclosure 20, the at least one support post 30 can be moved as desired along the at least one side channel, or removed from the at least one side channel, until a desired configuration of the system 10 is achieved. Thus, the system 10 permits users to quickly and securely change shelving or cargo-support configurations without damaging or altering the body of the vehicle.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

What is claimed is:

1. A system for storing cargo within a vehicle enclosure having a plurality of walls, the system comprising:
  a plurality of support posts, wherein each support post of the plurality of support posts has a longitudinal length, each support post comprising:
    a first mounting portion and a second mounting portion extending along a common cross-sectional longitudinal axis, wherein the first mounting portion and the second mounting portion each comprise:
      a first side wall extending substantially parallel to the cross-sectional longitudinal axis;
      a second side wall extending substantially parallel to the cross-sectional longitudinal axis;
      a base wall extending substantially perpendicular to the cross-sectional longitudinal axis and joining the first and second side walls, wherein the first side wall, the second side wall, and the base wall cooperate to define a U-shaped receiving channel;
      a first flange member extending inwardly from the first side wall toward the cross-sectional longitudinal axis within the U-shaped receiving channel; and
      a second flange member extending inwardly from the second side wall toward the cross-sectional longitudinal axis within the U-shaped receiving channel, wherein the second flange member is positioned in opposition to the first flange member; and
    a connecting member for joining the first and second mounting portions, wherein the connecting member is connected to and positioned therebetween the base walls of the first and second mounting portions, wherein the connecting member extends substantially parallel to the common cross-sectional longitudinal axis, and wherein at least portions of the base walls of the first and second mounting portions cooperate with the connecting member to define a central receiving channel; and
  a plurality of fasteners, wherein at least one fastener of the plurality of fasteners is configured to selectively secure each support post of the plurality of support posts within the vehicle enclosure.

2. The system of claim 1, wherein the first flange member and the second flange member of the first mounting portion of each support post of the plurality of support posts are substantially equally spaced from the base wall of the first mounting portion, and wherein the first flange member and the second flange member of the second mounting portion are substantially equally spaced from the base wall of the second mounting portion.

3. The system of claim 1, wherein the first flange member of the first mounting portion of each support post of the plurality of support posts is substantially offset from the second flange member of the first mounting portion along the cross-sectional longitudinal axis, and wherein the first flange member of the second mounting portion of each support post of the plurality of support posts is substantially offset from the second flange member of the second mounting portion along the cross-sectional longitudinal axis.

4. The system of claim 1, wherein each support post of the plurality of support posts further comprises a first central flange member and a second central flange member, wherein the first central flange member extends inwardly from the base wall of the first mounting portion toward the central receiving channel, and wherein the second central flange extends inwardly from the base wall of the second mounting portion toward the central receiving channel.

5. The system of claim 4, wherein the first central flange member and the second central flange member of each support post of the plurality of support posts are substantially equally spaced from the connecting member.

6. The system of claim 4, wherein the first central flange member of each support post of the plurality of support posts is substantially offset from the second central flange member of each support post relative to the cross-sectional longitudinal axis.

7. The system of claim 1, wherein the second side walls of the first and second mounting portions of each support post of the plurality of support posts define a plurality of bores spaced along the longitudinal length of each support post.

8. The system of claim 7, wherein at least one fastener of the plurality of fasteners is configured for selective insertion therein at least one bore of the plurality of bores spaced along the longitudinal length of each support post of the plurality of support posts.

9. The system of claim 8, further comprising at least one side channel defined therein at least one support wall of the plurality of walls of the vehicle enclosure, wherein the at least one side channel is configured to receive a portion of the fasteners that are inserted therein the bores of each support post.

10. The system of claim 9, wherein the at least one side channel comprises:
a receiving side channel positioned intermediate a top portion and a bottom portion of the at least one support wall of the plurality of walls of the vehicle enclosure.

11. The system of claim 10, wherein the at least one support wall of the plurality of walls of the vehicle enclosure has an inner surface positioned substantially within a plane, wherein the receiving side channel has a longitudinal axis that is substantially coaxial with the inner surface of the at least one support wall, and wherein the receiving side channel is positioned substantially flush with the inner surface of the at least one support wall.

12. The system of claim 1, wherein the U-shaped receiving channels of the first and second mounting portions and the central receiving channel of each support post are configured to selectively receive at least one fastener of the plurality of fasteners.

13. The system of claim 12, wherein each fastener of the plurality of fasteners comprises at least one of spring clips, tie rings, knobs, and screws.

14. The system of claim 12, further comprising a cargo net configured for operative coupling to at least one fastener of the plurality of fasteners.

15. The system of claim 12, further comprising at least one support shelf configured to support cargo within the vehicle enclosure.

16. The system of claim 12, further comprising at least one of a bin, a pipe rack, and a garment rack configured to retain cargo within the vehicle enclosure.

17. The system of claim 12, wherein the means for retaining the cargo within the vehicle enclosure further comprises a cargo track configured for positioning along at least a portion of a wall of the vehicle enclosure.

18. A support post for supporting cargo within a vehicle enclosure, the support post having a longitudinal length, wherein the support post comprises:
a first mounting portion and a second mounting portion extending along a common cross-sectional longitudinal axis, wherein the first mounting portion and the second mounting portion each comprise:
a first side wall extending substantially parallel to the cross-sectional longitudinal axis;
a second side wall extending substantially parallel to the cross-sectional longitudinal axis;
a base wall extending substantially perpendicular to the cross-sectional longitudinal axis and joining the first and second side walls, wherein the first side wall, the second side wall, and the base wall cooperate to define a U-shaped receiving channel;
a first flange member extending inwardly from the first side wall toward the cross-sectional longitudinal axis within the U-shaped receiving channel; and
a second flange member extending inwardly from the second side wall toward the cross-sectional longitudinal axis within the U-shaped receiving channel, wherein the second flange member is positioned in opposition to the first flange member; and
a connecting member for joining the first and second mounting portions, wherein the connecting member is connected to and positioned therebetween the base walls of the first and second mounting portions, wherein the connecting member extends substantially parallel to the common cross-sectional longitudinal axis, and wherein at least portions of the base walls of the first and second mounting portions cooperate with the connecting member to define a central receiving channel.

19. The support post of claim 18, further comprising a first central flange member and a second central flange member, wherein the first central flange member extends inwardly from the base wall of the first mounting portion toward the central receiving channel, and wherein the second central flange extends inwardly from the base wall of the second mounting portion toward the central receiving channel.

20. The support post of claim 18, wherein the U-shaped receiving channels of the first and second mounting portions and the central receiving channel are each configured to receive at least one fastener.

* * * * *